United States Patent
Hishinuma et al.

(10) Patent No.: US 9,159,545 B2
(45) Date of Patent: Oct. 13, 2015

(54) EXCIMER LAMP

(71) Applicant: USHIO DENKI KABUSHIKI KAISHA, Tokyo (JP)

(72) Inventors: Nobuyuki Hishinuma, Hyogo (JP); Yukiharu Tagawa, Hyogo (JP); Junya Asayama, Hyogo (JP); Koichi Takegoshi, Hyogo (JP); Kosuke Yamada, Hyogo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/362,262

(22) PCT Filed: Nov. 29, 2012

(86) PCT No.: PCT/JP2012/080938
§ 371 (c)(1),
(2) Date: Sep. 26, 2014

(87) PCT Pub. No.: WO2013/081054
PCT Pub. Date: Jun. 6, 2013

(65) Prior Publication Data
US 2015/0035429 A1    Feb. 5, 2015

(30) Foreign Application Priority Data

Dec. 2, 2011  (JP) ................. 2011-264384
Dec. 16, 2011 (JP) ................. 2011-275476
Jan. 31, 2012 (JP) ................. 2012-018151

(51) Int. Cl.
*H01J 61/06* (2006.01)
*H01J 61/42* (2006.01)
(Continued)

(52) U.S. Cl.
CPC ............. *H01J 61/06* (2013.01); *C02F 1/325* (2013.01); *H01J 5/54* (2013.01); *H01J 61/34* (2013.01);
(Continued)

(58) Field of Classification Search
None
See application file for complete search history.

(56) References Cited

U.S. PATENT DOCUMENTS

| 5,666,026 A | 9/1997 | Matsuno et al. |
| 5,763,999 A * | 6/1998 | Matsuno et al. ............ 313/573 |
| 6,177,763 B1 | 1/2001 | Morrow |
| 6,194,821 B1 * | 2/2001 | Nakamura ................. 313/238 |
| 6,398,970 B1 | 6/2002 | Justel et al. |

(Continued)

FOREIGN PATENT DOCUMENTS

| JP | H08-096770 A | 4/1996 |
| JP | H11-265688 A | 9/1999 |

(Continued)

OTHER PUBLICATIONS

International Search Report issued in Application No. PCT/JP2012/080938, mailed Mar. 5, 2013.

(Continued)

*Primary Examiner* — Ashok Patel
(74) *Attorney, Agent, or Firm* — Michael Best & Friedrich LLP

(57) ABSTRACT

A first excimer lamp includes: a quartz glass-made light-emitting tube containing an excimer emission gas sealed therein; and a pair of electrodes for generating dielectric barrier discharge. One of the pair of electrodes is disposed in the inner space of the light-emitting tube so as to extend in the direction of a tube axis of the light-emitting tube, and the other one of the pair of electrodes is embedded in the tube wall of the light-emitting tube so as to extend in the direction of the tube axis of the light-emitting tube. The one electrode is electrically connected to a conductive foil hermetically embedded in an end portion of the light-emitting tube.

14 Claims, 19 Drawing Sheets

(51) Int. Cl.
*C02F 1/32* (2006.01)
*H01J 5/54* (2006.01)
*H01J 61/34* (2006.01)
*H01J 61/92* (2006.01)
*H01J 65/04* (2006.01)

(52) U.S. Cl.
CPC ............... *H01J 61/42* (2013.01); *H01J 61/92* (2013.01); *H01J 65/04* (2013.01); *H01J 65/046* (2013.01); *C02F 2201/3223* (2013.01)

(56) References Cited

U.S. PATENT DOCUMENTS

| | | | |
|---|---|---|---|
| 6,570,301 B1* | 5/2003 | Hishinuma et al. | 313/36 |
| 2003/0015479 A1 | 1/2003 | Kuennen et al. | |
| 2003/0215751 A1* | 11/2003 | Otake et al. | 430/311 |
| 2007/0210713 A1 | 9/2007 | Lomaev et al. | |
| 2008/0185536 A1* | 8/2008 | Schiene et al. | 250/492.1 |
| 2010/0164410 A1* | 7/2010 | Greuel et al. | 315/326 |
| 2011/0156581 A1 | 6/2011 | Yasuda et al. | |
| 2011/0297844 A1* | 12/2011 | Vecziedins et al. | 250/432 R |

FOREIGN PATENT DOCUMENTS

| | | |
|---|---|---|
| JP | 2001-015078 A | 1/2001 |
| JP | 2003-112179 A | 4/2003 |
| JP | 2003-323868 A | 11/2003 |
| JP | 2004-227820 A | 8/2004 |
| JP | 2005-322618 A | 11/2005 |
| JP | 2006-202603 A | 8/2006 |
| JP | 2009-004234 A | 1/2009 |
| JP | 2009-224089 A | 10/2009 |
| JP | 2009-291068 A | 12/2009 |
| WO | WO-2011/153388 A2 | 12/2011 |

OTHER PUBLICATIONS

Written Opinion of International Searching Authority of PCT/JP2012/080938, mailed Mar. 5, 2013.

\* cited by examiner

EXCIMER LAMP

TECHNICAL FIELD

The present invention relates to an excimer lamp.

BACKGROUND ART

Low-pressure mercury lamps have been widely used as light sources of water treatment apparatuses for, for example, performing so-called sterilization to decompose organic materials contained in water or to kill germs contained in water (see, for example, Patent Literatures 1 and 2).

However, when a low-pressure mercury lamp is used as the light source of a water treatment apparatus, the low-pressure mercury lamp is often placed in water to be treated. A problem that occurs under such use conditions is that the light-emission characteristics of the low-pressure mercury lamp are greatly affected by the temperature of water.

The reason that such a problem occurs is that the low-pressure mercury lamp contains mercury as a light-emitting material and the vapor pressure of mercury must reach a prescribed level during operation in order to obtain a favorable light-emitting state. When the temperature of water is extremely low, mercury is not sufficiently vaporized, and this causes a problem in that sufficient light emission is not obtained.

Recently, in view of such circumstances, so-called mercury-free lamps that do not use mercury as a light-emitting material receive attention as light source lamps constituting light sources of water treatment apparatuses. For example, a lamp using xenon as a light-emitting material has been proposed (see, for example, Patent Literature 3).

Specifically, Patent Literature 3 discloses, as a light source lamp of a water treatment apparatus, a discharge lamp including: a light-emitting tube made of a light-transmitting dielectric material such as quartz glass; and electrodes (external electrodes) disposed on the outer surface of the light-emitting tube (this discharge lamp may be hereinafter referred to as an "external electrode discharge lamp").

However, in this external electrode discharge lamp, the electrodes to which high voltage is applied are located outside and exposed, and this causes various problems depending on use environment conditions.

Specifically, when an external electrode discharge lamp is used as the light source of a water treatment apparatus and disposed in water to be treated, the external electrodes come into contact with water, so corrosion may occur in the external electrodes. Corrosion of the external electrodes causes not only a problem in that the external electrodes themselves wear and therefore adversely affect discharge but also a problem in that corrosion products falling from the surfaces of the corroded external electrodes are mixed into the water to be treated. Another problem is that since the external electrodes are exposed to the outside of the light-emitting tube, an electric leakage or an electric shock may occur, so that sufficient safety cannot be obtained.

These problems not only occur when the external electrode discharge lamp is used as the light source of a water treatment apparatus but also occur similarly when the external electrode discharge lamp is used as the light source of, for example, an air sterilization apparatus because water vapor is present in air.

In some types of external electrode discharge lamps, a light-emitting tube including electrodes (external electrodes) disposed on its outer surface is disposed inside a wrapper tube. In the external electrode discharge lamp having the above configuration, the external electrodes do not come into contact with water even when the lamp is placed in water. However, when air is present inside the wrapper tube, micro discharge may occur in the gaps between the light-emitting tube and the external electrodes, and therefore ozone may be generated. This causes a problem in that harmful effects such as corrosion of the electrodes occur.

One possible solution to the above problems is to dispose the pair of electrodes inside the light-emitting tube.

Excimer lamps having a configuration in which a pair of electrodes are disposed inside a light-emitting tube have been proposed as one type of mercury-free lamp (see, for example, Patent Literatures 4 and 5).

More specifically, Patent Literature 4 discloses an excimer lamp including: a cylindrical light-emitting tube having sealed portions at both ends; and metal rods constituting a pair of electrodes and disposed such that one ends of the rods are located inside the light-emitting tube and the other ends protrude outward from sealed portions and extend therefrom. In at least one of the metals rods constituting the electrodes of the above excimer lamp, the surface of the one end located inside the light-emitting tube and functioning as an electrode is covered with a dielectric layer made of a dielectric material.

Patent Literature 5 discloses an excimer lamp including: a light-emitting tube having a cylindrical outer tube that is made of a dielectric material and has closed opposite ends; and two cylindrical inner tubes that are made of a dielectric material and have open opposite ends. In the light-emitting tube of this excimer lamp, the two inner tubes extend along the tube axis of the outer tube, and the openings of the inner tubes are disposed so as to protrude outward from the ends of the outer tube. A light-emitting space is formed by the inner surface of the outer tube and the outer surfaces of the inner tubes located inside the outer tube. In this excimer lamp, a metal rod constituting one of electrodes is disposed inside one of the inner tubes, and a metal rod constituting the other electrode is disposed inside the other inner tube.

The excimer lamp disclosed in Patent Literature 4 has a configuration in which the surface of an electrode is covered with a dielectric layer. However, this excimer lamp has a problem in that, particularly when glass is used as the dielectric material and the dielectric layer is interposed between the light-emitting tube and the metal rod constituting the electrode at a seal portion of the light-emitting tube, the light-emitting tube may break at the seal portion because of the difference in thermal expansion coefficient between the material of the metal rod and the dielectric material. This problem also occurs in a seal portion of the light-emitting tube when the light-emitting tube and a metal rod constituting an electrode are in direct contact with each other and the light-emitting tube is made of the same material as the dielectric material (the material constituting the dielectric layer).

The excimer lamp disclosed in Patent Literature 5 has a configuration in which the electrodes are disposed inside the inner tubes having at both ends openings in communication with the outside. This excimer lamp has a problem in that, when the electrodes (metal rods) are spaced apart from the inner surfaces of the inner tubes, the capacitance of the inner tubes becomes small.

To prevent oxidation of the electrodes (metal rods) disposed inside the inner tubes, the inside of each inner tube must be reduced in pressure or have an inert gas atmosphere. For example, it is conceivable that an inert gas is caused to flow inside the inner tubes when the lamp emits light as shown in Patent Literature 5. Alternatively, it is conceivable that opposite ends of the inner tubes are sealed to form sealed spaces inside the inner tubes, and the sealed spaces are reduced in pressure or filled with an inert gas. However, the following problems occur in these cases.

To cause the inert gas to flow inside the inner tubes, means for causing the inert gas to flow must be provided separately. To seal the opposite ends of the inner tubes, hermetic seal structures must be formed by bringing the metal rods constituting the electrodes into intimate contact with the ends of the inner tubes. Therefore, particularly when glass is used as the dielectric material constituting the inner tubes, a problem occurs in that the seal portions may break because of the difference in thermal expansion coefficient between the material of the metal rods and material of the inner tubes (the dielectric material).

CITATION LIST

Patent Literature

Patent Literature 1: Japanese Patent Application Laid-Open No. 2008-260017
Patent Literature 2: Japanese Patent Application Laid-Open No. Hei. 2-222765
Patent Literature 3: Japanese Patent Application Laid-Open No. 2001-15078
Patent Literature 4: Japanese Patent Application Laid-Open No. 2006-024564
Patent Literature 5: Japanese Patent Application Laid-Open No. 2006-202603

SUMMARY OF INVENTION

Technical Problem

The present invention has been made on the basis of the foregoing circumstances and has as its first object the provision of an excimer lamp in which no corrosion occurs in the electrodes in any use environment and high safety is thereby obtained and in which the occurrence of breakage of the end portions of the light-emitting tube each having a hermetic seal structure formed therein is suppressed to allow a long service life to be achieved.

The present invention has as its second object the provision of an excimer lamp which has a configuration in which a pair of electrodes are disposed inside a light-emitting tube, and in which large electric power can be supplied to a light-emitting space, and the occurrence of breakage of the end portions of the light-emitting tube each having a hermetic seal structure formed therein is suppressed to allow a long service life to be achieved. In addition, this excimer lamp can be easily produced.

The present invention has as its third object the provision of an excimer lamp which has a configuration in which a pair of electrodes are disposed inside a light-emitting tube, and in which the occurrence of breakage of the end portions of the light-emitting tube each having a hermetic seal structure formed therein is suppressed to allow a long service life to be achieved. In addition, this excimer lamp has excellent startability.

Solution to Problem

A first excimer lamp of the present invention includes: a light-emitting tube made of quartz glass and containing an excimer emission gas sealed therein; and a pair of electrodes for generating dielectric barrier discharge; wherein one of the pair of electrodes is disposed in an internal space of the light-emitting tube so as to extend in a direction of a tube axis of the light-emitting tube, the other one of the pair of electrodes is embedded in a tube wall of the light-emitting tube so as to extend in the direction of the tube axis of the light-emitting tube, and the one of the pair of electrodes is electrically connected to a conductive foil hermetically embedded in an end portion of the light-emitting tube.

In the first excimer lamp of the present invention, a phosphor layer may preferably be formed on an inner surface of the light-emitting tube, the phosphor layer containing a phosphor that emits ultraviolet rays when the phosphor receives, as excitation light, excimer light produced from an excimer generated from the excimer emission gas.

In the first excimer lamp of the present invention, the phosphor may preferably emit light having a wavelength of not more than 300 nm.

In the first excimer lamp of the present invention, the other one of the pair of electrodes may preferably be supplied with electric power through inductive coupling with a power supply electrode disposed outside the light-emitting tube.

A second excimer lamp of the present invention includes a light-emitting tube containing an excimer emission gas sealed therein, wherein a pair of electrodes extending in a direction of a tube axis of the light-emitting tube are provided inside the light-emitting tube, one of the pair of electrodes is disposed in a hermetic space formed in a cylindrical tube, the cylindrical tube being made of a dielectric material and disposed inside the light-emitting tube so as to extend in the direction of the tube axis of the light-emitting tube, the one of the pair of electrodes being disposed in contact with an inner surface of a tube wall of the cylindrical tube, the other one of the pair of electrodes is disposed so as to face the one of the pair of electrodes with a light-emitting space that is formed between the light-emitting tube and the cylindrical tube being interposed between the pair of electrodes, and the pair of electrodes are electrically connected to respective conductive foils hermetically embedded in end portions of the light-emitting tube.

In the second excimer lamp of the present invention, one end of the cylindrical tube may preferably be foil-sealed integrally with the light-emitting tube.

In the second excimer lamp of the present invention, the one of the pair of electrodes may preferably have a coil shape.

In the second excimer lamp of the present invention, the hermetic space inside the cylindrical tube may preferably be reduced in pressure or filled with an inert gas.

In the second excimer lamp of the present invention, the other one of the pair of electrodes may preferably have a coil shape spiraled so as to surround the cylindrical tube.

In the second excimer lamp of the present invention, a phosphor layer may preferably be formed on an inner surface of a tube wall of the light-emitting tube, the phosphor layer containing a phosphor that emits ultraviolet rays when the phosphor receives, as excitation light, excimer light produced from an excimer generated from the excimer emission gas.

A third excimer lamp of the present invention includes: a light-emitting tube containing an excimer emission gas sealed therein; and a pair of electrodes disposed inside the light-emitting tube, wherein a cylindrical tube made of a dielectric material is provided inside the light-emitting tube so as to extend in a direction of a tube axis of the light-emitting tube, one of the pair of electrodes is disposed inside the cylindrical tube so as to extend in a direction of a tube axis of the cylindrical tube, the other one of the pair of electrodes is disposed so as to extend along the tube axis of the cylindrical tube, at least part of the other one of the pair of electrodes is in intimate contact with an outer surface of the cylindrical tube, the one of the pair of electrodes and the other one of the pair of electrodes facing each other through a tube wall of the cylindrical tube in at least one portion within an intimate contact region, and the one of the pair of electrodes and the other one of the pair of electrodes are electrically connected to conductive foils hermetically embedded in end portions of the light-emitting tube, respectively.

In the third excimer lamp, the one of the pair of electrodes may preferably be disposed in contact with an inner surface of the cylindrical tube in the intimate contact region.

In the third excimer lamp, the other one of the pair of electrodes may preferably be spaced apart from the outer surface of the cylindrical tube in a region other than the intimate contact region, and a space interposed between the other one of the pair of electrodes and the outer surface of the cylindrical tube within the region other than the intimate contact region may preferably form an excimer discharge space.

In the third excimer lamp, the other one of the pair of electrodes may preferably be in contact with an inner surface of the light-emitting tube in at least part of a region other than the intimate contact region.

Advantageous Effects of Invention

In the first excimer lamp of the present invention, one of the electrodes is disposed inside the light-emitting tube, and the other electrode is disposed in the tube wall of the light-emitting tube. Therefore, dielectric barrier discharge can be generated between the pair of electrodes, so radiation light can be obtained by utilizing the dielectric barrier discharge. Since any of the pair of electrodes are not exposed to the outside of the light-emitting tube, the electrodes do not come into contact with gas, liquid, etc. that is present outside the light-emitting tube according to the use environment, so no harmful effects occur which are caused when the electrodes are exposed to the outside of the light-emitting tube. Since the one electrode and the other electrode face each other in a reliable manner irrespective of the embedded position of the other electrode in the tube wall of the light-emitting tube, stable discharge is obtained in the inner space of the light-emitting tube.

A hermetically sealed portion having a foil seal structure in which a conductive foil electrically connected to the one electrode is embedded is formed in an end portion of the light-emitting tube. In this configuration, the one electrode and the light-emitting tube are not in direct contact with each other in the hermetically sealed portion. Therefore, when the lamp emits light, although thermal expansion occurs in the one electrode and the conductive foil, the thermal expansion in the one electrode and the conductive foil can be absorbed by plastic deformation of the conductive foil and thereby relaxed. Therefore, the occurrence of breakage of the hermetically sealed portion due to the difference in thermal expansion coefficient between the material of the electrodes, the material of the conductive foil and the material of the light-emitting tube can be suppressed.

In the first excimer lamp of the present invention, no corrosion occurs in the electrodes in any use environment, and high safety can thereby be obtained. In addition, since the occurrence of breakage of the end portion of the light-emitting tube in which the hermetic seal structure is formed is suppressed, long service life is obtained.

In the second excimer lamp of the present invention, one of the electrodes is disposed in the hermetic space inside the cylindrical tube made of a dielectric material so as to be in contact with the inner surface of the tube wall of the cylindrical tube, and the other electrode is disposed so as to face the one electrode through the tube wall of the cylindrical tube and the light-emitting space. Therefore, dielectric barrier discharge can be generated between the pair of electrodes, so radiation light can be obtained by utilizing the dielectric barrier discharge. Since the pair of electrodes are disposed inside the light-emitting tube and are not exposed to the outside of the light-emitting tube, the electrodes do not come into contact with gas, liquid, etc. that is present outside the light-emitting tube according to the use environment, so no harmful effects occur which are caused when the electrodes are exposed to the outside of the light-emitting tube.

Hermetically sealed portions having foil seal structures in which conductive foils electrically connected to the respective ones of the pair of electrodes are embedded are formed in the end portions of the light-emitting tube. In this configuration, the electrodes and the light-emitting tube are not in direct contact with each other in the hermetically sealed portions. Therefore, when the lamp emits light, although thermal expansion occurs in the electrodes and the conductive foils, the thermal expansion in the electrodes and the conductive foils can be absorbed by plastic deformation of the conductive foils and thereby relaxed. The occurrence of breakage of the hermetically sealed portions due to the difference in thermal expansion coefficient between the material of the electrodes, the material of the conductive foils and the material of the light-emitting tube can thereby be suppressed. Since the cylindrical tube disposed with the one electrode in contact therewith can have a large capacitance, the pair of electrodes can be supplied with large electric power, and the light-emitting space can thereby be supplied with larger electric power. Moreover, since each of the hermetically sealed portions at the ends of the light-emitting tube has a foil seal structure, these hermetically sealed portions can be easily formed by pinch sealing or shrink sealing.

Therefore, according to the second excimer lamp of the present invention, the light-emitting space can be supplied with large electric power. In addition, the occurrence of breakage of each end portion of the light-emitting tube having the hermetic seal structure formed therein is suppressed, and long service life can thereby be obtained. Moreover, the second excimer lamp can be easily produced.

No corrosion occurs in the electrode even in any use environment, so high safety can be achieved.

In the second excimer lamp of the present invention, one end of the cylindrical tube is foil-sealed integrally with the light-emitting tube. This allows a member for supplying the one electrode with electric power to be prevented from being exposed in the light-emitting space inside the light-emitting tube, so the occurrence of undesirable discharge in the light-emitting space can be prevented. In addition, the cylindrical tube can be held at a prescribed placement position inside the light-emitting tube.

In the second excimer lamp of the present invention, the one electrode is formed into a coil shape. Therefore, even when the area of contact between the one electrode and the cylindrical tube is increased to increase the capacitance of the cylindrical tube, thermal expansion generated in the one electrode when the lamp emits light can be absorbed at least partially by the one electrode itself, i.e., the coil shape thereof. This can suppress the occurrence of breakage of the cylindrical tube due to the difference in thermal expansion coefficient between the material of the electrodes and the material of the cylindrical tube.

In the third excimer lamp of the present invention, the pair of electrodes are disposed inside the light-emitting tube and are not exposed to the outside of the light-emitting tube. Therefore, the electrodes do not come into contact with gas, liquid, etc. that is present outside the light-emitting tube according to the use environment, so no harmful effects occur which are caused when the electrodes are exposed to the outside of the light-emitting tube.

Since at least part of the other electrode is in intimate contact with the outer surface of the cylindrical tube, the one electrode and the other electrode can face each other with almost no insulating space interposed therebetween in the intimate contact region in which the other electrode is in intimate contact with the outer surface of the cylindrical tube. Therefore, breakdown voltage necessary to allow dielectric breakdown to occur in the intimate contact region can be reduced. By allowing dielectric breakdown to occur in the intimate contact region, discharge can be initiated between the pair of electrodes, and a large starting voltage is not required to initiate discharge between the pair of electrodes.

Hermetically sealed portions having foil seal structures in which conductive foils electrically connected to the respective electrodes are embedded are formed in the end portions of the light-emitting tube. In this configuration, the electrodes and the light-emitting tube are not in direct contact with each other in the hermetically sealed portions. Therefore, when the lamp emits light, although thermal expansion occurs in the electrodes and the conductive foils, the thermal expansion in the electrodes and the conductive foils can be absorbed by plastic deformation of the conductive foils and thereby relaxed. The occurrence of breakage of the hermetically sealed portions due to the difference in thermal expansion coefficient between the material of the electrodes, the material of the conductive foils and the material of the light-emitting tube can thereby be suppressed.

In the third excimer lamp of the present invention, the occurrence of breakage of the end portions of the light-emitting tube in which the hermetic seal structures are formed is suppressed. Therefore, long service life can be achieved, and good startability can be obtained.

No corrosion occurs in the electrodes even in any use environment, so high safety can be obtained.

In the third excimer lamp of the present invention, the other electrode is spaced apart from the outer surface of the cylindrical tube in a region other than the intimate contact region, and a space interposed between the other electrode and the outer surface of the cylindrical forms an excimer discharge space. This allows the pair of electrodes to be spaced a large distance from each other in the region other than the intimate contact region to increase the thickness of the excimer discharge space. Therefore, large radiant intensity can be obtained without loss of favorable startability.

In the third excimer lamp of the present invention, when the other electrode is partially in contact with the inner surface of the light-emitting tube in a region other than the intimate contact region, the portion of the other electrode in contact with the inner surface of the light-emitting tube has a positioning and holding function. Therefore, the other electrode can be held at a prescribed placement position in the light-emitting space inside the light-emitting tube in a prescribed state.

DESCRIPTION OF EMBODIMENTS

Embodiments of the present invention will next be described.

First, second and third excimer lamps of the present invention are configured to obtain radiation light by utilizing the phenomenon that an excimer is generated from an excimer emission gas by discharge. More specifically, these excimer lamps are discharge lamps configured to emit excimer light produced from an excimer generated from the excimer emission gas or configured to emit light obtained by irradiating a phosphor with the excimer light as excitation light to excite the phosphor (the light emitted may be referred to also as "phosphor-converted light").

Each of the first, second and third excimer lamps of the present invention has the following features. Any of a pair of electrodes is not exposed to the outside of a light-emitting tube. At least one of the pair of electrodes is disposed inside the light-emitting tube, and the electrode disposed inside the light-emitting tube is electrically connected to a conductive foil hermetically embedded in an end portion of the light-emitting tube.

The first, second and third excimer lamps of the present invention will next be described in detail.

<First Excimer Lamp>

Figure 1:
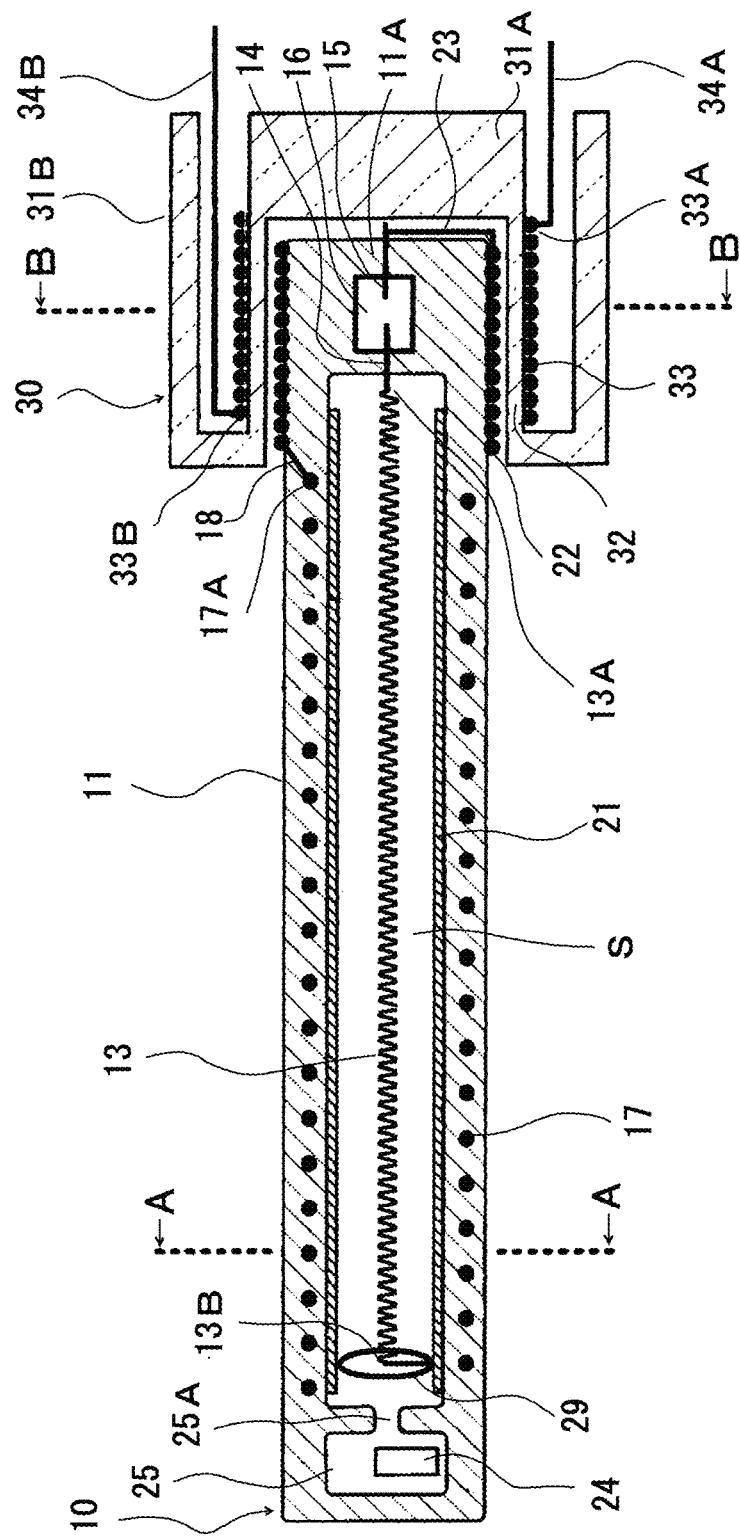
[FIG. 1] is a cross-sectional view for explaining an exemplary configuration of a first excimer lamp of the present invention with a socket attached to one end of the excimer lamp.
Figure 2:
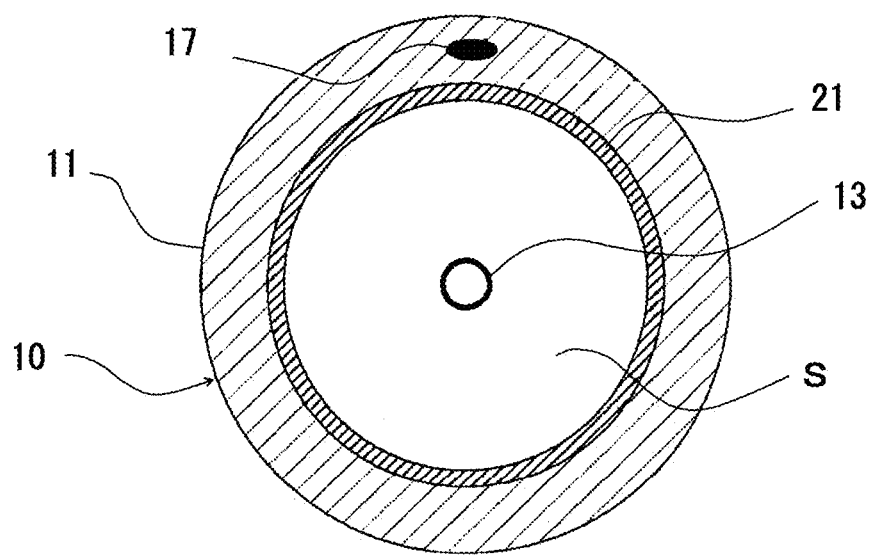
[FIG. 2] is an enlarged cross-sectional view illustrating an A-A cross section in FIG. 1.
Figure 3:
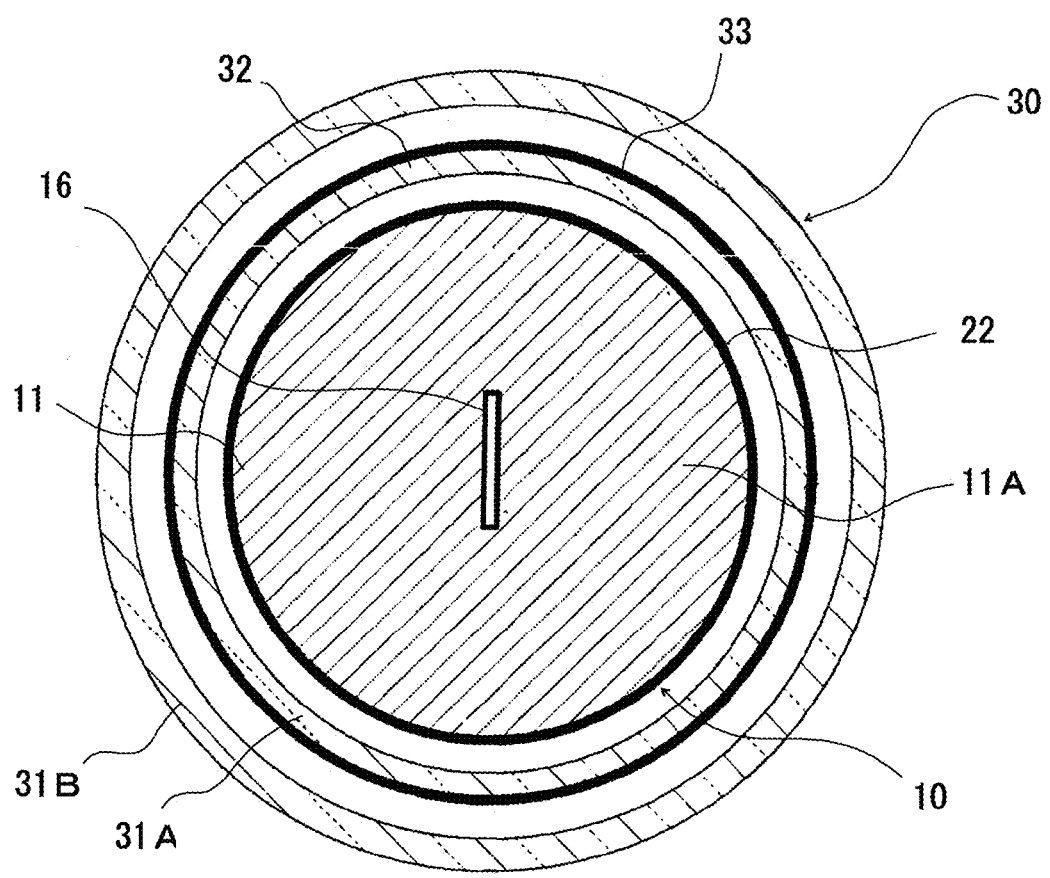
[FIG. 3] is an enlarged cross-sectional view illustrating a B-B cross section in FIG. 1.

FIG. 1 is a cross-sectional view for explaining an exemplary configuration of the first excimer lamp of the present invention with a socket attached to one end of the excimer lamp. FIG. 2 is an enlarged cross-sectional view illustrating an A-A cross section in FIG. 1, and FIG. 3 is an enlarged cross-sectional view illustrating a B-B cross section in FIG. 1.

The first excimer lamp 10 includes a substantially cylindrical light-emitting tube 11 made of quartz glass, which is a light-transmitting dielectric material. The light-emitting tube 11 has a sealed portion 11A formed at one end (the right end in FIG. 1) with the other end (the left end in FIG. 1) closed and therefore has a light-emitting space S within the hermetic inner space of the light-emitting tube 11. The sealed portion 11A of the light-emitting tube 11 has a foil seal structure in which a conductive foil 16 made of molybdenum is hermetically embedded.

An excimer emission gas is sealed in the light-emitting space S of the light-emitting tube 11, and a first electrode 13 is disposed in the light-emitting space S so as to extend along the center axis (tube axis) of the light-emitting tube 11. A second electrode 17 is embedded in the tube wall of the light-emitting tube 11 so as to extend along the center axis (tube axis) of the light-emitting tube 11. In this manner, the pair of electrodes constituting the first excimer lamp 10, more specifically the first electrode 13 and the second electrode 17, are disposed so as to face each other through the tube wall of the light-emitting tube 11 and the light-emitting space S.

In the example in this figure, the foil seal structure in the sealed portion 11A is formed by pinch sealing or shrink sealing.

A ceramic-made socket 30 is attached to the one end of the first excimer lamp 10 in which the sealed portion 11A is formed, and a power supply coil (hereinafter referred to also as a "socket-side terminal") 33 included in a power supply mechanism described later is provided in the socket 30. A power supply coil (hereinafter referred to also as a "lamp-side terminal") 22 that, together with the socket-side terminal 33, constitutes the power supply mechanism is provided in the one end portion of the first excimer lamp 10 to which the socket 30 is attached.

In the example shown in this figure, the lamp-side terminal 22 is formed, for example, by spirally winding a molybdenum wire on the outer surface of one end portion of the light-emitting tube 11. The lamp-side terminal 22 is not limited to that disposed on the outer surface of the one end portion of the light-emitting tube 11 of the first excimer lamp 10 as shown in FIG. 1 and may be embedded in the tube wall of the one end portion of the light-emitting tube 11 of the first excimer lamp 10.

The first electrode 13 is a coil-shaped electrode formed, for example, by spirally winding a metal wire.

The coil-shaped electrode is made of a metal material such as tungsten having electric conductive properties and heat resistance and is disposed on the center axis (tube axis) of the light-emitting tube 11 within the light-emitting space S. More specifically, the first electrode 13 is disposed such that its center axis coincides with the center axis (tube axis) of the light-emitting tube 11 and extends along the center axis of the light-emitting tube 11.

An internal lead rod 14 made of molybdenum is connected to one end 13A of the first electrode 13, and one end (the right end in FIG. 1) of the internal lead rod 14 extends into the sealed portion 11A and is connected to the conductive foil 16. An external lead rod 15 made of molybdenum and having one end (the right end in FIG. 1) extending and protruding outward from the sealed portion 11A is connected to the conductive foil 16. The external lead rod 15 is electrically connected to the lamp-side terminal 22 through a connection member 23 formed from a nickel wire.

In the example shown in this figure, a ring-shaped supporter 29 is attached to the other end 13B of the first electrode 13. The supporter 29 has a positioning and holding function for holding the first electrode 13 at a prescribed placement position in the light-emitting space S and also functions as an auxiliary electrode when the first excimer lamp 10 is turned on. More specifically, when the supporter 29 is provided, the supporter 29 serves as a trigger for actuation of the first excimer lamp 10 when it is actuated. First, discharge occurs around the supporter 29, and then discharge occurs in the light-emitting space S of the light-emitting tube 11 over the entire region in the direction of the tube axis of the light-emitting tube 11.

The second electrode 17 is composed of a coil-shaped electrode formed, for example, by spirally winding a metal wire so as to surround the light-emitting space S.

This coil-shaped electrode is disposed inside the tube wall of the light-emitting tube 11 in a region of the light-emitting tube 11 other than the region to which the socket 30 is attached. More specifically, the coil-shaped electrode extends along the center axis (tube axis) of the light-emitting tube 11 while spiraling so as to surround the light-emitting space S. The coil-shaped electrode is fully embedded in the tube wall of the light-emitting tube 11, i.e., the entire coil-shaped electrode is embedded in the tube wall of the light-emitting tube 11.

For example, molybdenum or tungsten can be used as the material of the second electrode 17, and molybdenum is preferably used.

A connection member 18 formed from a nickel wire is connected to one end 17A of the second electrode 17, and a front end (the right end in FIG. 1) of the connection member 18 is led out of the interior of the tube wall of the light-emitting tube 11 and electrically connected to the lamp-side terminal 22.

An exemplary method of embedding the second electrode 17 in the tube wall of the light-emitting tube 11 will be described below. For example, the second electrode 17 and two glass tubes for forming the light-emitting tube are prepared. One glass tube has an outer diameter substantially the same as the inner diameter (the coil inner diameter) of the second electrode 17 (hereinafter this glass tube may be referred to also as an "inner glass tube"), and the other glass tube has an inner diameter slightly larger than the outer diameter (the coil diameter) of the second electrode 17 (hereinafter this glass tube may be referred to also as an "outer glass tube"). Then the second electrode 17 is wound around the outer surface of the inner glass tube, and the inner glass tube with the second electrode 17 wound therearound is inserted into the outer glass tube to thereby produce a tubular assembly. After one end of the thus-obtained tubular assembly is closed, the tubular assembly is evacuated to reduce the pressure inside to $10^{-1}$ Pa or lower. Then the tubular assembly with the one end closed is heated from the outside using an oxyhydrogen burner to heat-shrink the outer glass tube, and the outer glass tube is thereby brought into intimate contact with the inner glass tube with the second electrode 17 therebetween. The second electrode 17 can thereby be embedded in the tube wall of the light-emitting tube material formed by integrating the inner glass tube and the outer glass tube.

Fused quartz glass or synthetic quartz glass is used as the quartz glass constituting the light-emitting tube 11.

The excimer emission gas used is a noble gas such as xenon gas (Xe), argon gas (Ar) or krypton gas (Kr) having the function as a discharge medium that generates an excimer by dielectric barrier discharge. If necessary, a halogen gas such as fluorine gas (F), chlorine gas (Cl), iodine gas (I) or bromine gas (Br) is used together with the noble gas.

The type of noble gas sealed in the light-emitting space S as the excimer emission gas and the type of halogen gas sealed as needed are appropriately selected according to the wavelength of light that is required to be emitted from the first excimer lamp 10.

For example, when xenon gas is used as the excimer emission gas, excimer light with a wavelength of 172 nm is obtained. When a gas mixture of argon gas and chlorine gas is used as the excimer emission gas, excimer light with a wavelength of 175 nm is obtained. When a gas mixture of krypton gas and iodine gas is used as the excimer emission gas, excimer light with a wavelength of 191 nm is obtained. When a gas mixture of argon gas and fluorine gas is used as the excimer emission gas, excimer light with a wavelength of 193 nm is obtained. When a gas mixture of krypton gas and bromine gas is used as the excimer emission gas, excimer light with a wavelength of 207 nm is obtained. When a gas mixture of krypton gas and chlorine gas is used as the excimer emission gas, excimer light with a wavelength of 222 nm is obtained.

Preferably, in the first excimer lamp 10, a phosphor layer 21 containing a phosphor that emits ultraviolet rays when it receives excimer light as excitation light is provided on the inner surface of the light-emitting tube 11 over the entire region in which at least one of the first electrode 13 and the second electrode 17 is disposed, as shown in FIGS. 1 and 2.

When the phosphor layer 21 is provided on the inner surface of the light-emitting tube 11, relatively short-wavelength light emitted from the excimer produced by dielectric barrier discharge can be converted to long-wavelength light.

More specifically, in the first excimer lamp 10 configured to have the phosphor layer 21 formed on the inner surface of the light-emitting tube 11, relatively short-wavelength excimer light (hereinafter referred to also as "short-wavelength-side excimer light") for excitation of the phosphor constituting the phosphor layer 21 is obtained by dielectric barrier discharge. Then the phosphor constituting the phosphor layer 21 is irradiated with the obtained short-wavelength-side excimer light to excite the phosphor, whereby light in a prescribed wavelength range, specifically, light with a longer wavelength than that of the short-wavelength-side excimer light, is obtained (the obtained light is referred to as "phosphor-converted light"). The thus-obtained phosphor-converted light is emitted through the phosphor layer 21 and the light-emitting tube 11.

The phosphor constituting the phosphor layer 21 is preferably a phosphor that emits light having a wavelength of 300 nm or less (ultraviolet rays) when it receives excimer light as excitation light.

As specific examples of the phosphor, may be mentioned praseodymium-activated lanthanum phosphate, neodymium-activated lanthanum phosphate, neodymium-activated yttrium phosphate and praseodymium-activated yttrium aluminum borate.

Praseodymium-activated lanthanum phosphate emits light having a wavelength in a range around 230 nm upon excitation. Neodymium-activated lanthanum phosphate emits light having a wavelength in a range around 184 nm upon excitation. Neodymium-activated yttrium phosphate emits light having a wavelength around 190 nm upon excitation. Praseodymium-activated yttrium aluminum borate emits light having a wavelength around 250 nm upon excitation.

In the phosphor layer 21, the adhesion between the phosphor and the quartz glass (fused quartz glass) constituting the light-emitting tube 11 is small. Therefore, it is preferable to use an adhesive between the phosphor layer 21 and the light-emitting tube 11, in order to obtain high adhesion between the phosphor layer 1 and the light-emitting tube 11.

As examples of the adhesive, may be mentioned soft glass powders and hard glass powders.

A getter 24 may be disposed in the inner space of the light-emitting tube 11 as shown in FIG. 1.

The getter 24 is made of a material that can absorb at least oxygen generated in the light-emitting space S from the light-emitting tube 11 etc. through, for example, the action of ultraviolet rays. As specific examples of the material of the getter 24, may be mentioned a zirconium (Zr)-aluminum (Al) alloy, a zirconium (Zr)-iron (Fe) alloy and a zirconium (Zr)-aluminum (Al)-iron (Fe) alloy.

In the example in this figure, the getter 24 is accommodated in a getter accommodation space 25 provided in the other end portion (the left end portion in FIG. 1) of the light-emitting tube 11, and the getter accommodation space 25 is in communication with the light-emitting space S through a communication path 25A. The communication path 25A has an inner diameter smaller than the outer diameter (the smallest outer diameter) of the getter 24. Therefore, the getter 24 is held within the getter accommodation space 25 and does not move into the light-emitting space S although no special holding mechanism is provided.

The socket 30 includes a socket body having a recessed overall shape so that the one end portion of the first excimer lamp 10 can be inserted thereinto. The socket body includes: a lamp accommodation portion 31A having an opening on one side (the left side in FIG. 1) and a cylindrical lamp accommodation space for insertion of the one end portion of the first excimer lamp 10; and a terminal accommodation portion 31B provided so as to surround the lamp accommodation portion 31A and having a terminal accommodation space for accommodation of the socket-side terminal 33. The socket-side terminal 33 is disposed in the terminal accommodation portion 31B of the socket body.

In the socket 30, the socket-side terminal 33 is formed, for example, by spirally winding a copper wire around the outer surface of a partition wall 32 that faces the terminal accommodation space, the partition wall 32 separating the terminal accommodation space and the accommodation space from each other. The socket-side terminal 33 is disposed so as to face the lamp-side terminal 22 of the first excimer lamp 10 when the first excimer lamp 10 is inserted into the lamp accommodation portion 31A.

A connection member 34A formed from a copper wire is connected to one end 33A of the socket-side terminal 33, and a connection member 34B formed from a copper wire is connected to the other end 33B. These connection members 34A and 34B are connected to a high-frequency AC power source (not shown).

When the socket 30 having the above-described configuration is attached to the first excimer lamp 10, the lamp-side terminal 22 connected to the first electrode 13 and the second electrode 17 and the socket-side terminal 33 connected to the high-frequency AC power source are positioned substantially concentrically about the tube axis of the light-emitting tube 11 as shown in FIG. 3, whereby the power supply mechanism for supplying electric power to the first excimer lamp 10 through inductive coupling is formed. More specifically, the second electrode 17 of the first excimer lamp 10 is supplied with electric power through inductive coupling between the second electrode 17 and a power supply electrode composed of the socket-side terminal 33 disposed outside the light-emitting tube 11, specifically inductive coupling between the lamp-side terminal 22 electrically connected to the second electrode 17 and the socket-side terminal 33.

The power supply mechanism configured to supply power through inductive coupling has an advantage in safety because the power supply members (specifically, the lamp-side terminal 22 and the socket-side terminal 33) are not exposed to the outside.

An example of the specifications of the first excimer lamp 10 configured as described above is as follows. The light-emitting tube 11 has an outer diameter of 16 mm, an inner diameter of 14 mm and an overall length of 140 mm. The coil-shaped electrode constituting the first electrode 13 has a wire diameter of 0.3 mm, an outer diameter (coil diameter) of 2 mm and a coil pitch of 1 mm. The coil-shaped electrode constituting the second electrode 17 has a wire diameter of 0.1 mm, and the distance between adjacent portions of the wire is 8 mm.

Xenon gas used as a discharge medium is sealed in the light-emitting space S of the light-emitting tube 11 at a pressure of 13 kPa, and AC power is supplied between the first electrode 13 and the second electrode 17 under the conditions of a rated frequency of 70 kHz, a rated voltage of 1.7 kV$_{p-p}$ and a rated power consumption of 18 W.

In the above first excimer lamp 10, high-frequency AC power is supplied from the high-frequency AC power source to the socket-side terminal 33 through the connection members 34A and 34B, and this causes inductive coupling between the socket-side terminal 33 and the lamp-side terminal 22 disposed in the first excimer lamp 10, whereby the first excimer lamp 10 is supplied with electric power. In the first excimer lamp 10, dielectric barrier discharge occurs in the light-emitting space S, and an excimer is thereby formed. The light emitted from the excimer (short-wavelength-side excimer light) excites the phosphor constituting the phosphor layer 21, whereby light (phosphor-converted light) having a wavelength longer than that of the short-wavelength-side excimer light is emitted through the phosphor layer 21 and the light-emitting tube 11.

In the first excimer lamp 10, the dielectric barrier discharge is formed uniformly in the extending direction of the first electrode 13 (the left-right direction in FIG. 1) and radially about the first electrode 13.

In the first excimer lamp 10 described above, the first electrode 13 is disposed in the light-emitting space S of the light-emitting tube 11, and the second electrode 17 is embedded in the tube wall of the light-emitting tube 11. Both the first electrode 13 and second electrode 17 are not exposed to the outside of the light-emitting tube 11. Since the first electrode 13 and the second electrode 17 do not come into contact with gas, liquid, etc. that is present outside the light-emitting tube 11 according to the use environment, no harmful effects occur which are caused when the electrodes for obtaining dielectric barrier discharge are exposed to the outside of the light-emitting tube 11. As examples of such harmful effects, may be mentioned the occurrence of an electric shock or an electric leakage, the occurrence of corrosion in the electrodes and the formation of ozone by micro discharge generated in a gap between the light-emitting tube and an electrode in the presence of air.

The sealed portion 11A having a foil seal structure is formed at an end of the light-emitting tube 11 and is configured such that the first electrode 13 and the internal lead rod 14 do not come into direct contact with the light-emitting tube 11 within the sealed portion 11A. Therefore, when the lamp emits light, although thermal expansion occurs in the first electrode 13, the internal lead rod 14 and the conductive foil 16, the thermal expansion can be absorbed by plastic deformation of the conductive foil 16 and thereby relaxed. The occurrence of breakage of the sealed portion 11A due to the difference in thermal expansion coefficient between the material of the electrodes, the material of the internal lead rod, the material of the conductive foil and the material of the light-emitting tube can thereby be suppressed.

In the first excimer lamp 10, since the first electrode 13 is disposed in the light-emitting space S of the light-emitting tube 11, even when the second electrode 17 is embedded in any position inside the tube wall of the light-emitting tube 11, the first electrode 13 and the second electrode 17 reliably face each other. Therefore, discharge occurs radially from the first electrode 13 toward the outside of the light-emitting tube 11, and uniform discharge is obtained in the light-emitting space S, so that high design flexibility is obtained. Thus, even when the placement position of the second electrode 17 is displaced, i.e., the second electrode 17 is disposed at a position slightly displaced from a prescribed placement position, a favorable light emission state can be obtained.

Figure 4:
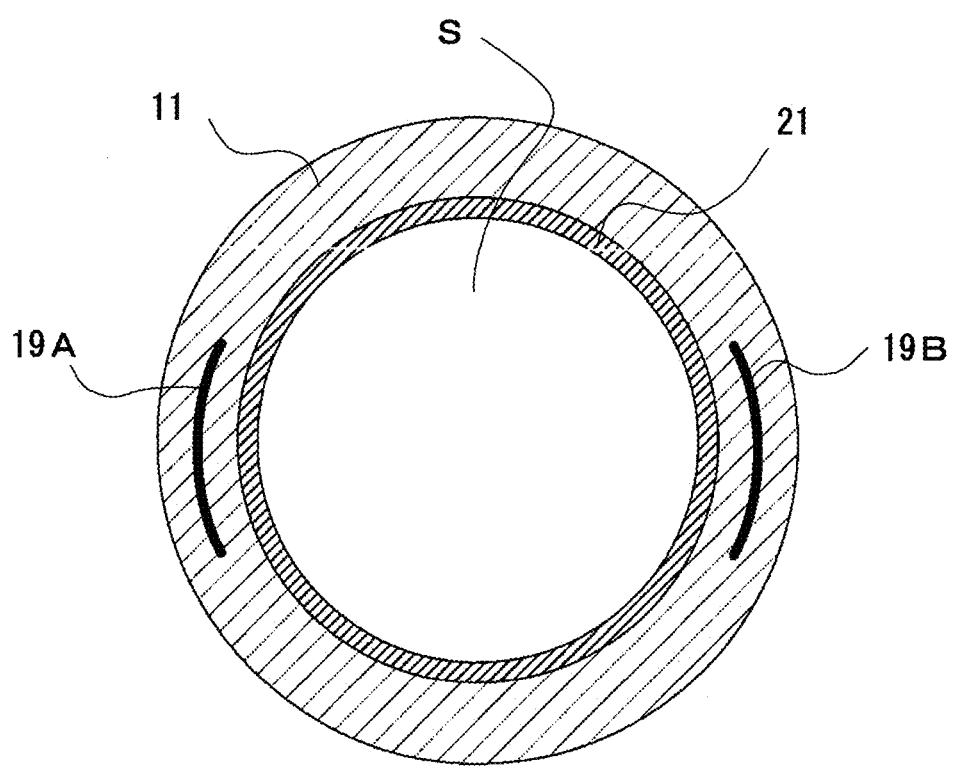
[FIG. 4] is a cross-sectional view for explaining an excimer lamp with a pair of electrodes disposed inside a tube wall of a light-emitting tube.

In an excimer lamp configured to obtain radiation light by utilizing dielectric barrier discharge, a configuration shown in FIG. 4 can be used in order to obtain a state in which a pair of electrodes for obtaining dielectric barrier discharge are not exposed to the outside of the light-emitting tube 11. More specifically, both the pair of electrodes 19A and 19B are embedded in the tube wall of the light-emitting tube 11. However, in the excimer lamp having the above configuration, it is not easy to embed the electrodes 19A and 19B in prescribed placement positions inside the tube wall of the light-emitting tube 11. In addition, when the placement positions of the electrodes 19A and 19B are displaced, even if the positional displacements of the electrodes 19A and 19B are very small, a harmful effect such as a failure of obtaining uniform discharge in the light-emitting space S may occur, so that a favorable light emission state may not be obtained.

The first excimer lamp of the present invention is not limited to the above embodiment, and various modifications can be made.

For example, in the first excimer lamp of the present invention, the first electrode and the second electrode can have any shape, so long as the first electrode is disposed in the inner space of the light-emitting tube so as to extend along its tube axis and the second electrode is embedded in the tube wall of the light-emitting tube so as to extend along its tube axis. Any combination of the shape of the first electrode and the shape of the second electrode may be used.

Figure 5:
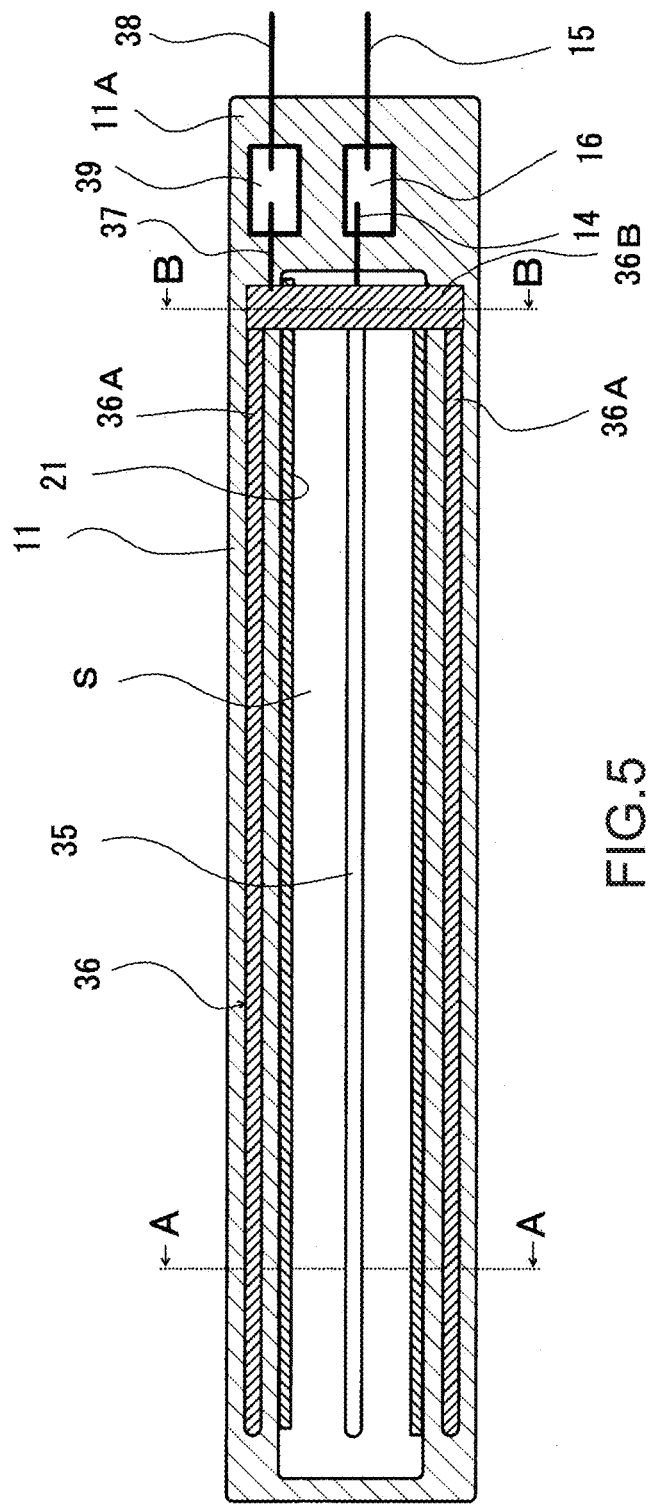
[FIG. 5] is a cross-sectional view for explaining another exemplary configuration of the first excimer lamp of the present invention.

As specific examples of the first electrode, may be mentioned, in addition to the coil-shaped electrode shown in FIG. 1, a rod-shaped electrode formed from a metal rod (see FIG. 5). As specific examples of the second electrode, may be mentioned, in addition to the coil-shaped electrode shown in FIG. 1, a band-shaped electrode formed from a metal foil (see FIG. 5), a wire-shaped electrode formed from a metal wire disposed linearly along the tube axis of the light-emitting tube, a net-shaped electrode and a seamless net-shaped electrode (see Japanese Patent No. 2775697). As specific examples of the combination of the first electrode and the second electrode, may be mentioned, in addition to the combination of a coil-shaped electrode used as the first electrode and a coil-shaped electrode used as the second electrode as shown in FIG. 1, a combination of a coil-shaped electrode used as the first electrode and a band-shaped electrode used as the second electrode, a combination of a rod-shaped electrode used as the first electrode and a coil-shaped electrode used as the second electrode and a combination of a rod-shaped electrode used as the first electrode and a band-shaped electrode used as the second electrode (see FIG. 5).

The first electrode is not limited to the form in which it is disposed so as to be exposed in the light-emitting space of the light-emitting tube. For example, the first electrode may have a form in which electrode is covered with a member formed from a dielectric material such as quartz glass and is therefore not exposed in the light-emitting space.

A getter may be disposed inside the light-emitting tube as shown in FIG. 1, or no getter may be disposed thereinside as shown in FIG. 5. A supporter may or may not be provided.

Particularly, when the first electrode has, for example, a small diameter or a large length, it is preferable to provide a supporter as shown in FIG. 1.

The power supply mechanism may be configured to supply electric power directly to an external lead rod electrically connected to the first electrode and to an external lead rod electrically connected to the second electrode as described later (see FIG. 5) or may be configured to supply electric power through capacitive coupling to the first excimer lamp with the second electrode connected to the high-frequency AC power source and the first electrode grounded.

When the power supply mechanism is configured to supply electric power through capacitive coupling, the first excimer lamp can have higher light-emission efficiency than that when a power supply mechanism configured to supply electric power through inductive coupling is used.

Another embodiment of the first excimer lamp of the present invention will be specifically described using the drawings.

Figure 6:
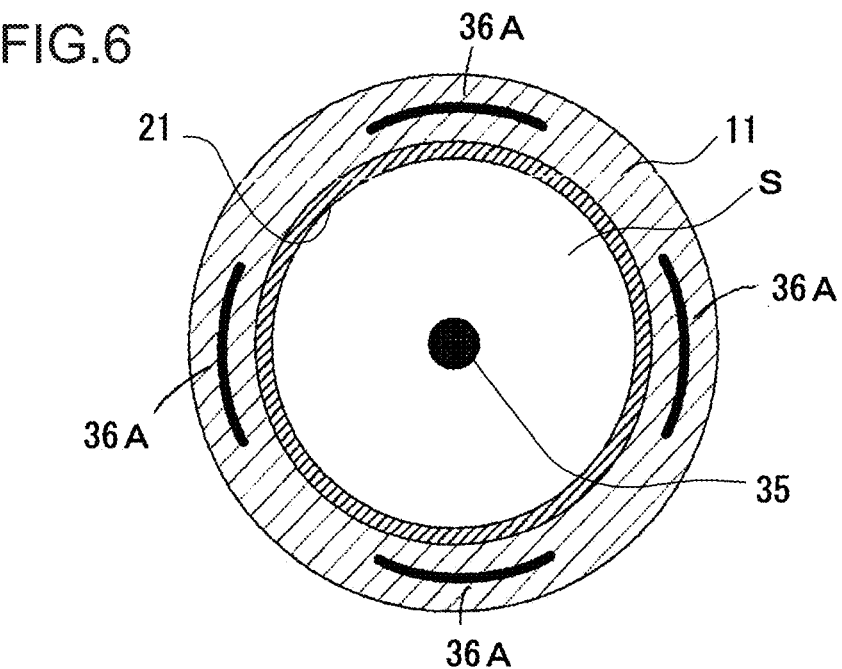
[FIG. 6] is an enlarged cross-sectional view illustrating an A-A cross section in FIG. 5.
Figure 7:
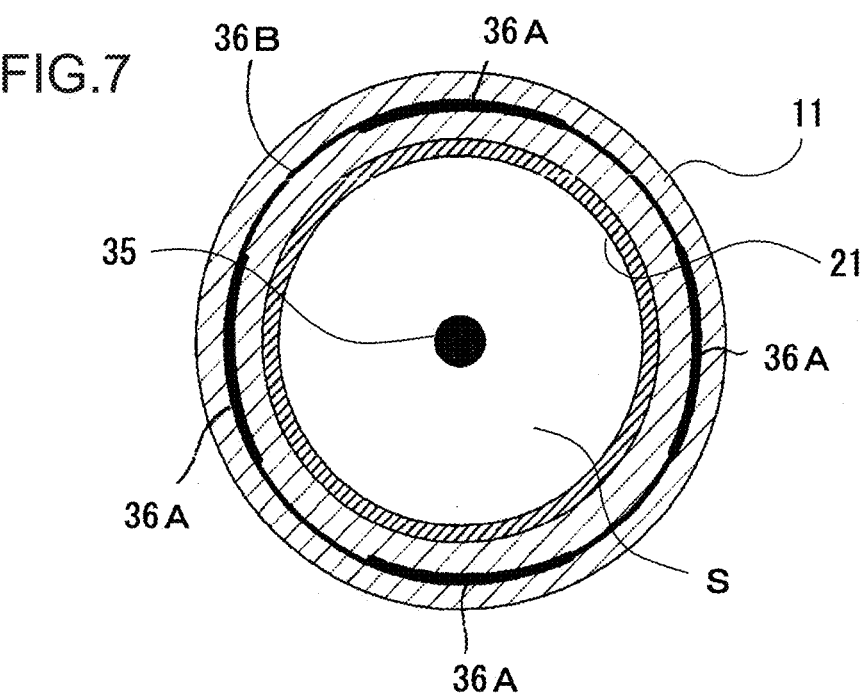
[FIG. 7] is an enlarged cross-sectional view illustrating a B-B cross section in FIG. 5.

FIG. 5 is a cross-sectional view for explaining another exemplary configuration of the first excimer lamp of the present invention. FIG. 6 is an enlarged cross-sectional view illustrating an A-A cross section in FIG. 5, and FIG. 7 is an enlarged cross-sectional view illustrating a B-B cross section in FIG. 5.

This first excimer lamp has the same configuration as that of the first excimer lamp 10 in FIG. 1 except that first and second electrodes having shapes different from those in the first excimer lamp 10 in FIG. 1 are provided, that a power supply mechanism having a different configuration is provided, and that no supporter, no getter and no getter accommodation space are provided inside the light-emitting tube 11.

In the first excimer lamp in FIG. 5, a first electrode 35 is a rod-shaped electrode formed from a metal rod made of, for example, tungsten.

In the rod-shaped electrode constituting the first electrode 35, an internal lead rod 14 made of molybdenum is connected to one end (the right end in FIG. 5) of the first electrode 35, and one end (the right end in FIG. 5) of the internal lead rod 14 extends into the sealed portion 11A of the light-emitting tube 11 and is connected to the conductive foil 16 made of molybdenum and embedded in the sealed portion 11A. An external lead rod 15 made of molybdenum is connected to the conductive foil 16, and one end (the right end in FIG. 5) of the external lead rod 15 extends outward and protrudes from the sealed portion 11A.

A second electrode 36 includes a plurality of band-shaped electrodes 36A (four electrodes in FIG. 5) formed from a metal foil made of, for example, molybdenum. The plurality of band-shaped electrodes 36A are embedded in the tube wall of the light-emitting tube 11 within a region surrounding the light-emitting space S so as to extend along the center axis (tube axis) of the light-emitting tube 11. The plurality of band-shaped electrodes 36A are embedded so as to be spaced apart from each other at prescribed intervals in the circumferential direction of the light-emitting tube 11.

A connection conductive foil 36B made of molybdenum is connected to one ends (the right ends in FIG. 5) of the band-shaped electrodes 36A, and the plurality of band-shaped electrodes 36A are electrically connected to each other through the connection conductive foil 36B. The connection conductive foil 36B is embedded in the tube wall of the light-emitting tube 11 at one end portion (the right end portion in FIG. 5) of the region surrounding the light-emitting space S so as to extend in the circumferential direction of the light-emitting tube 11. An internal lead rod 37 made of molybdenum and embedded in the sealed portion 11A is connected to the connection conductive foil 36B, and one end (the right end in FIG. 5) of the internal lead rod 37 is connected to a conductive foil 39 made of molybdenum and embedded in the sealed portion 11A. An external lead rod 38 made of molybdenum is connected to the conductive foil 39, and one end (the right end in FIG. 5) of the external lead rod 38 extends outward and protrudes from the sealed portion 11A.

Figure 8:
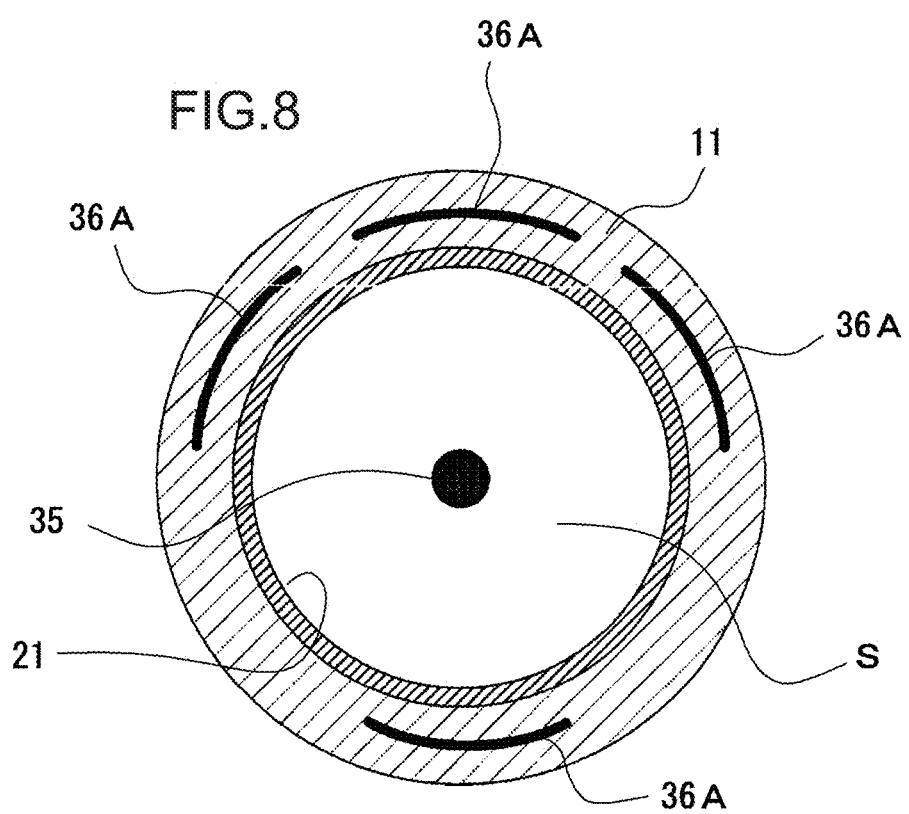
[FIG. 8] is a cross-sectional view for explaining another example of a plurality of placement positions of peripheral electrodes composed of band-shaped electrodes that constitute the first excimer lamp of the present invention in FIG. 5.

In the example in this figure, the number of band-shaped electrodes 36A constituting the second electrode 36 is four, but the number is not limited to four. The plurality of band-shaped electrodes 36A constituting the second electrode 36 are embedded in the tube wall of the light-emitting tube 11 at regular intervals in the circumferential direction of the light-emitting tube 11, but the intervals of the plurality of embedded band-shaped electrodes 36A are not limited to regular intervals and may be irregular as shown in, for example, FIG. 8. The plurality of embedded band-shaped electrodes 36A distributed unevenly in a specific direction are effective when the band-shaped electrodes 36A are allowed to function as reflective members.

The power supply mechanism is formed by connecting the external lead rod 15 electrically connected to the first electrode 35 and the external lead rod 38 electrically connected to the second electrode 36 to a high-frequency AC power source (not shown).

An example of the specifications the first excimer lamp in FIG. 5 configured as described above is as follows. The light-emitting tube 11 has an outer diameter of 18 mm, an inner diameter of 16 mm and an overall length of 200 mm. The rod-shaped electrode constituting the first electrode 35 has an outer diameter of 1 mm and an overall length of 170 mm. The band-shaped electrodes 36A constituting the second electrode 36 have a thickness of 0.03 mm, a width of 2 mm and an overall length of 170 mm.

Xenon gas used as a discharge medium is sealed in the light-emitting space S of the light-emitting tube 11 at a pressure of 27 kPa, and AC power is supplied between the first electrode 35 and the second electrode 36 under the conditions of a rated frequency of 80 kHz, a rated voltage of 1.7 $kV_{p-p}$ and a rated power consumption of 22 W.

Also in the above first excimer lamp in FIG. 5, as in the first excimer lamp 10 in FIG. 1, corrosion of the electrodes is prevented in any use environment, and high safety is thereby obtained. In addition, the occurrence of breakage of the end portion of the light-emitting tube that has a hermetic seal structure formed therein is suppressed to allow a long service life to be achieved.

<Second Excimer Lamp>

Figure 9:
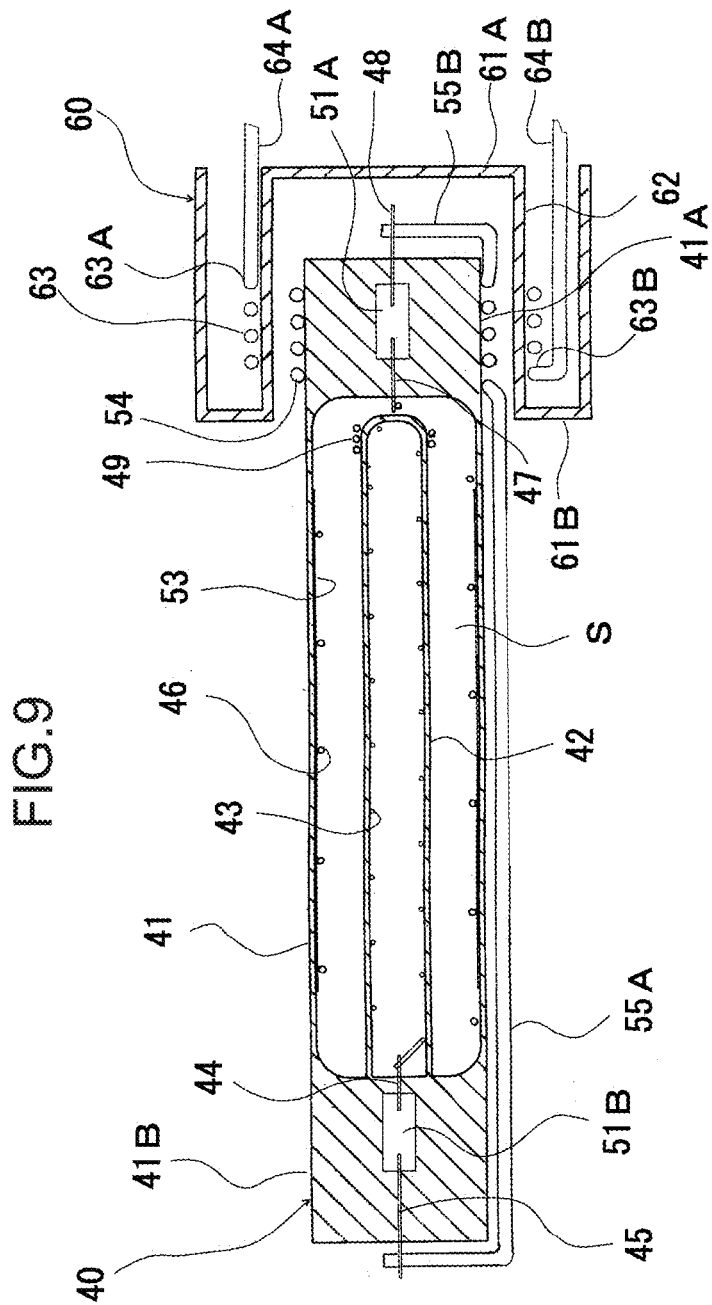
[FIG. 9] is a cross-sectional view for explaining an exemplary configuration of a second excimer lamp of the present invention with a socket attached to one end of the excimer lamp.
Figure 10:
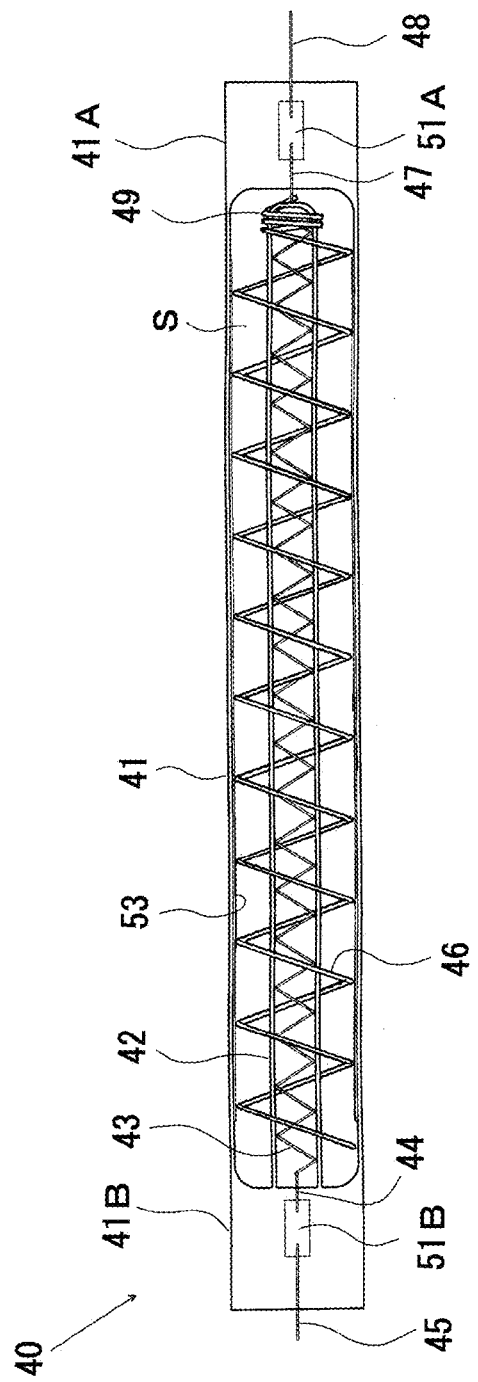
[FIG. 10] is an illustrative diagram showing the outline of the configuration of the excimer lamp in FIG. 9.

FIG. 9 is a cross-sectional view for explaining an exemplary configuration of the second excimer lamp of the present invention with a socket attached to one end of the excimer lamp, and FIG. 10 is an illustrative diagram showing the outline of the configuration of the excimer lamp in FIG. 9.

The second excimer lamp 40 includes a substantially cylindrical light-emitting tube 41 having a light-emitting space S within the hermetically sealed interior of the light-emitting tube 41. The light-emitting tube 41 has, at its opposite ends, sealed portions 41A and 41B in which conductive foils 51A and 51B made of molybdenum are hermetically embedded to thereby form foil seal structures.

A cylindrical tube 42 made of a dielectric material is disposed in the hermetically sealed interior of the light-emitting tube 41 so as to extend in the direction of the tube axis of the light-emitting tube 41 (the left-right direction in FIG. 9), and a first electrode 43 is disposed inside the cylindrical tube 42 so as to extend in the direction of the tube axis of the cylindrical tube 42. In the light-emitting tube 41, an excimer emission gas is sealed in the light-emitting space S surrounded by the inner surface of the light-emitting tube 41 and the outer surface of the cylindrical tube 42. A second electrode 46 is disposed in the light-emitting space S so as to extend along the center axis (tube axis) of the light-emitting tube 41 with the second electrode 46 spaced apart from the cylindrical tube 42. The pair of electrodes constituting the second excimer lamp 40, specifically the first electrode 43 and the second electrode 46, are thereby disposed so as to face each other through the tube wall of the cylindrical tube 42 and the light-emitting space S.

In the example in this figure, the foil seal structures in the sealed portions 41A and 41B are formed by pinch sealing. However, the foil seal structures in the sealed portions 41A and 41B may be formed by shrink sealing.

A ceramic-made socket 60 is attached to the one end of the second excimer lamp 40 in which the sealed portion 41A is formed, and a power supply coil (socket-side terminal) 63 constituting a power supply mechanism described later is disposed in the socket 60. A power supply coil (lamp-side terminal) 54 that, together with the socket-side terminal 63 of the socket 60, constitutes the power supply mechanism is provided in the one end portion of the second excimer lamp 40 to which the socket 60 is attached.

In the example shown in this figure, the lamp-side terminal 54 is formed, for example, by spirally winding a molybdenum wire on the outer surface of one end portion of the light-emitting tube 41, specifically the outer surface of the sealed portion 41A.

The cylindrical tube 42 has a substantially cylindrical shape. One end (the right end in FIGS. 9 and 10) of the cylindrical tube 42 is closed, and the other end thereof (the left end in FIGS. 9 and 10) is integrally connected to the inner end (the right end in FIGS. 9 and 10) of the sealed portion 41B of the light-emitting tube 41. The cylindrical tube 42 is thereby hermetically sealed, and a hermetic space for placing the first electrode 43 is formed inside the cylindrical tube 42.

In the sealed portion 41B to which the other end of the cylindrical tube 42 is integrally connected, an internal lead rod 44 electrically connected to the first electrode 43 is connected to the conductive foil 51B, and the other end of the cylindrical tube 42 is thereby foil-sealed integrally with the light-emitting tube 41.

A method of foil-sealing the other end of the cylindrical tube 42 integrally with the light-emitting tube 41 is, for example, as follows. A cylindrical tube-electrode assembly having the following configuration is produced. One end of the cylindrical tube-electrode assembly is closed, and a hermetically sealed portion having a foil seal structure is formed at the other end by pinch sealing. The first electrode 43 is disposed inside the cylindrical tube-electrode assembly. Next, the obtained cylindrical tube-electrode assembly is inserted into a light-emitting tube-forming tubular material. While a portion of the light-emitting tube-forming tubular material at which the hermetically sealed portion of the cylindrical tube-electrode assembly is located is heated, pressure is applied to this portion from the outside to pinch this portion. The hermetically sealed portion of the cylindrical tube-electrode assembly that is obtained in this formation step has a configuration in which the conductive foil 51B electrically connected to the first electrode 43 through the internal lead rod 44 is hermetically embedded and an external lead rod 45 connected to the conductive foil 51B protrudes outward from the hermetically sealed portion.

The conductive foil 51B is used to seal the other end of the light-emitting tube 41 and to seal the other end of the cylindrical tube 42 during production of the lamp, as described above. More specifically, the sealed portion 41B has a structure in which the other end of the cylindrical tube 42 that has a foil seal structure with the conductive foil 51B hermetically embedded therein is hermetically embedded in the other end of the light-emitting tube 41.

The first electrode 43 is composed of a coil-shaped electrode formed by spirally winding a metal wire made of a metal material such as tungsten having electric conductive properties and heat resistance.

This coil-shaped electrode is disposed on the center axis (tube axis) of the cylindrical tube 42 within the hermetic space in the cylindrical tube 42. Specifically, the first electrode 43 is disposed such that its center axis coincides with the center axis (tube axis) of the cylindrical tube 42 and extends along the center axis of the cylindrical tube 42.

The first electrode 43 is disposed in contact with the inner surface of the tube wall of the cylindrical tube 42. More specifically, the spirally wound metal wire constituting the first electrode 43 extends along the center axis (tube axis) of the cylindrical tube 42 while spiraling on the inner surface of the tube wall of the cylindrical tube 42 so as to surround the hermetic space in the cylindrical tube 42 and is disposed in intimate contact with the inner surface of the cylindrical tube 42.

The internal lead rod 44 made of molybdenum is connected to the other end (the left end in FIGS. 9 and 10) of the first electrode 43, and the other end (the left end in FIGS. 9 and 10) of the internal lead rod 44 extends into the sealed portion 41B and connected to the conductive foil 51B by spot welding. The external lead rod 45 having the other end (the left end in FIG. 9) protruding outward from the sealed portion 41B is connected to the conductive foil 51B by spot welding. The external lead rod 45 is electrically connected to the lamp-side terminal 54 through a connection member 55A made of molybdenum and disposed so as to extend along the outer surface of the light-emitting tube 41.

As described above, the first electrode 43 is electrically connected to the conductive foil 51B through the internal lead rod 44.

Preferably, in the cylindrical tube 42, the hermetic space thereinside is reduced in pressure or filled with an inert gas.

When the hermetic space inside the cylindrical tube 42 is reduced in pressure or filled with an inert gas, oxidation of the first electrode 43 disposed in the hermetic space inside the cylindrical tube 42 can be prevented.

When the hermetic space inside the cylindrical tube 42 is reduced in pressure, the pressure (the degree of vacuum) thereinside is preferably not higher than $10^{-2}$ Torr.

When the pressure inside the cylindrical tube 42 is set to be not higher than $10^{-2}$ Torr, the occurrence of discharge inside the cylindrical tube 42 can be suppressed, and additional power consumption caused by discharge inside the cylindrical tube 42 can thereby be suppressed.

When the hermetic space inside the cylindrical tube 42 is filled with an inert gas, it is preferable to use, as the inert gas, a gas that is less likely to be ionized than the excimer emission gas (discharge medium). Specifically, when xenon gas is used as the excimer emission gas, it is preferable to use nitrogen gas as the inert gas with which the cylindrical tube 42 is filled.

The use of a gas less likely to be ionized than the excimer emission gas as the inert gas can suppress the occurrence of discharge inside the cylindrical tube 42, and additional power consumption caused by discharge inside the cylindrical tube 42 can thereby be suppressed.

When the hermetic space inside the cylindrical tube 42 is filled with an inert gas, the pressure (gas pressure) inside the cylindrical tube 42 is preferably lower than the pressure (gas pressure) inside the light-emitting space S and is more preferably about the atmospheric pressure.

The dielectric material constituting the cylindrical tube 42 may not allow light generated in the light-emitting space S inside the light-emitting tube 41 to pass through.

When an end of the cylindrical tube 42 (the other end of the cylindrical tube 42 in FIGS. 9 and 10) is foil-sealed integrally with the light-emitting tube 41 as shown in FIGS. 9 and 10, it is preferable that the dielectric material constituting the cylindrical tube 42 has a thermal expansion coefficient equal to that of the material constituting the light-emitting tube 41. This is because the hermetically sealed portion (the sealed portion 41B in FIGS. 9 and 10) having a configuration in which the end of the cylindrical tube 42 is foil-sealed integrally with the light-emitting tube 41 can be prevented from breakage due to the difference in thermal expansion coefficient between the dielectric material constituting the cylindrical tube 42 and the material constituting the light-emitting tube 41.

In the example shown in these figures, the cylindrical tube 42 is made of the same material as that constituting the light-emitting tube 41.

The second electrode 46 is composed of a coil-shaped electrode formed by spirally winding a metal wire made of a metal material such as tungsten having electric conductive properties and heat resistance.

This coil-shaped electrode is disposed on the center axis (tube axis) of the light-emitting tube 41 within the light-emitting space S of the light-emitting tube 41. Specifically, the second electrode 46 is disposed such that its center axis coincides with the center axis (tube axis) of the light-emitting tube 41 and extends along the center axis of the light-emitting tube 41.

The second electrode 46 has an outer diameter (coil diameter) larger than the outer diameter of the cylindrical tube 42.

The second electrode 46 is formed from a spirally wound metal wire that extends along the center axis (tube axis) of the light-emitting tube 41 while spiraling in a region around the cylindrical tube 42 so as to surround the cylindrical tube 42. The second electrode 46 is disposed so as to be spaced apart from the outer surface of the cylindrical tube 42 through the light-emitting space S, i.e., with the tube wall of the cylindrical tube 42 and the light-emitting space S interposed between the second electrode 46 and the first electrode 43.

The second electrode 46 may be in contact with the inner surface of the tube wall of the light-emitting tube 41 so long as the second electrode 46 is spaced apart from the outer surface of the cylindrical tube 42 through the light-emitting space S within the light-emitting tube 41. However, when a phosphor layer 53 is provided on the inner surface of the wall surface of the light-emitting tube 41 as shown in FIGS. 9 and 10, the second electrode 46 must be spaced apart from the inner surface of the tube wall of the light-emitting tube 41.

In the example in the figures, the second electrode 46 is disposed so as to be in contact with the phosphor layer 53 formed on the inner surface of the tube wall of the light-emitting tube 41.

Preferably, the coil pitch of the coil-shaped electrode constituting the second electrode 46 is larger than the coil pitch of the coil-shaped electrode forming the first electrode 43, i.e., the coil pitch in the first electrode 43 is smaller than the coil pitch in the second electrode 46.

This is because, by increasing the coil pitch in the second electrode 46 as much as possible, blocking of light, generated in the light-emitting tube 41, by the second electrode 46 can be suppressed and because, by reducing the coil pitch in the first electrode 43, the electric capacity between the first electrode 43 and the second electrode 46 can be increased, so that the electric power inputted to the light-emitting space S can be increased.

Specific examples of the coil pitches in the first electrode 43 and the second electrode 46 are 2 mm for the coil pitch in the first electrode 43 and 10 mm for the coil pitch in the second electrode 46.

A connection member 49 formed from a tungsten wire and spirally wound around the outer surface of the one end portion (the right end portion in FIGS. 9 and 10) of the cylindrical tube 42 is connected to one end (the right end in FIGS. 9 and 10) of the second electrode 46, and an internal lead rod 47 made of molybdenum is connected to one end (the right end in FIGS. 9 and 10) of the connection member 49. One end (the right end in FIGS. 9 and 10) of the internal lead rod 47 extends into the sealed portion 41A and is connected to the conductive foil 51A by spot welding. An external lead rod 48 made of molybdenum is connected to the conductive foil 51A by spot welding, and one end (the right end in FIG. 9) of the external lead rod 48 extends outward and protrudes from the sealed portion 41A. The external lead rod 48 is electrically connected to the lamp-side terminal 54 through a connection member 55B made of a nickel wire disposed so as to extend along the outer surface of the light-emitting tube 41.

As described above, the second electrode 46 is electrically connected to the conductive foil 51A through the connection member 49 and the internal lead rod 47.

In the example in this figure, the second electrode 46 and the connection member 49 are integrated with each other. The connection member 49 and the first electrode 43 do not face each other through the tube wall of the light-emitting tube 41, and therefore no discharge occurs between the connection member 49 and the first electrode 43.

The material constituting the light-emitting tube 41 may be any of various materials that can transmit light generated in the light-emitting space S inside the light-emitting tube 41, specifically excimer light or phosphor-converted light.

As examples of the material constituting the light-emitting tube 41 when the light generated in the light-emitting space S is ultraviolet rays, may be mentioned quartz glass such as fused quartz glass and synthetic quartz glass.

The excimer emission gas used is a noble gas having the function as a discharge medium that generates an excimer by dielectric barrier discharge, as in the first excimer lamp. If necessary, a halogen gas is used together with the noble gas.

The type of noble gas sealed in the light-emitting space S as the excimer emission gas and the type of halogen gas sealed as needed are appropriately selected according to the wavelength of light that is required to be emitted from the second excimer lamp 40.

In the second excimer lamp 40, as in the first excimer lamp, the phosphor layer 53 containing a phosphor that emits ultraviolet rays when it receives excimer light as excitation light may be disposed on the inner surface of the tube wall of the light-emitting tube 41 over a region in which the first electrode 43 and the second electrode 46 are disposed, as shown in FIGS. 9 and 10.

Any known phosphor that emits ultraviolet rays when it receives excimer light as excitation light can be appropriately used as the phosphor constituting the phosphor layer 53 according to, for example, the application of the second excimer lamp 40.

As in the first excimer lamp, when the phosphor in the phosphor layer 53 has low adhesion to the material constituting the light-emitting tube 41 (for example, fused quartz glass), it is preferable to use a binder between the phosphor layer 53 and the light-emitting tube 41, in order to obtain high adhesion between the phosphor layer 53 and the light-emitting tube 41.

The socket 60 has basically the same configuration as that of the socket 30 attached to the first excimer lamp 10.

More specifically, the socket 60 includes a socket body having a recessed overall shape so that the one end portion of the second excimer lamp 40 can be inserted thereinto. The socket body includes: a lamp accommodation portion 61A having an opening on one side (the left side in FIG. 9) and a cylindrical lamp accommodation space for insertion of the one end portion of the second excimer lamp 40; and a terminal accommodation portion 61B provided so as to surround the lamp accommodation portion 61A and having a terminal accommodation space for accommodation of the socket-side terminal 63. The socket-side terminal 63 is disposed in the terminal accommodation portion 61B of the socket body.

In the socket 60, the socket-side terminal 63 is formed, for example, by spirally winding a copper wire around the outer surface of a partition wall 62 that faces the terminal accommodation space, the partition wall 62 separating the terminal accommodation space and the accommodation space from each other. The socket-side terminal 63 is disposed so as to face the lamp-side terminal 54 of the second excimer lamp 40 when the second excimer lamp 40 is inserted into the lamp accommodation portion 61A.

A connection member 64A formed from a copper wire is connected to one end 63A of the socket-side terminal 63, and a connection member 64B formed from a copper wire is connected to the other end 63B. These connection members 64A and 64B are connected to a high-frequency AC power source (not shown).

In the example shown in this figure, the socket-side terminal 63 and the connection members 64A and 64B are integrated with each other.

The lamp-side terminal 54 connected to the first electrode 43 and the second electrode 46 constituting the second excimer lamp 40 and the socket-side terminal 63 connected to the high-frequency AC power source are positioned substantially concentrically about the tube axis of the light-emitting tube 41 as shown in FIG. 9, whereby the power supply mechanism for supplying electric power to the second excimer lamp 40 through inductive coupling is formed.

The power supply mechanism configured to supply power through inductive coupling has an advantage in safety because the power supply members (specifically, the lamp-side terminal 54 and the socket-side terminal 63) can be disposed so as not to be exposed to the outside.

An example of the specifications of the second excimer lamp 40 configured as described above is as follows. The light-emitting tube 41 has an outer diameter of 15 mm, an inner diameter of 13 mm and an overall length of 165 mm, and the cylindrical tube 42 has an outer diameter of 8 mm, an inner diameter of 6 mm and an overall length of 146 mm. The conductive foils 51A and 51B are each a molybdenum foil.

The coil-shaped electrode constituting the first electrode 43 is formed from a tungsten wire having a wire diameter of 0.36 mm and has an outer diameter (coil diameter) of 6 mm, a coil pitch of 4.7 mm and an overall length of 116 mm.

The coil-shaped electrode constituting the second electrode 46 is formed from a tungsten wire having a wire diameter of 0.36 mm and has an outer diameter (coil diameter) of 10 mm, a coil pitch of 6.9 mm and an overall length (an overall length of the coil portion) of 135 mm.

Xenon gas used as the excimer emission gas is sealed in the light-emitting space S of the light-emitting tube 41 at a pressure of 40 kPa, and nitrogen gas is sealed in the hermetic space of the cylindrical tube 42 at a pressure of 50 kPa. AC power is supplied between the first electrode 43 and the second electrode 46 under the conditions of a rated frequency of 65 kHz and a rated voltage of 3.5 $kV_{p-p}$.

In the above second excimer lamp 40, high-frequency AC power is supplied from the high-frequency AC power source to the socket-side terminal 63 through the connection members 64A and 64B, and this causes inductive coupling between the socket-side terminal 63 and the lamp-side terminal 54 disposed in the second excimer lamp 40, whereby electric power is supplied to the second excimer lamp 40. In the second excimer lamp 40, dielectric barrier discharge occurs in the light-emitting space S, and an excimer is thereby formed. The excimer light emitted from the excimer (for example, vacuum-ultraviolet light) excites the phosphor constituting the phosphor layer 53, whereby light (for example, light having a wavelength of 190 to 400 nm) having a wavelength longer than that of the excimer light (for example, vacuum-ultraviolet light) is emitted through the phosphor layer 53 and the light-emitting tube 41.

In the second excimer lamp 40 described above, the pair of electrodes are disposed inside the light-emitting tube 41. Since the pair of electrodes do not come into contact with gas, liquid, etc. that is present outside the light-emitting tube 41 according to the use environment, no harmful effects occur which are caused when the electrodes for obtaining dielectric barrier discharge are exposed to the outside of the light-emitting tube 41.

The sealed portions 41A and 41B each having a foil seal structure are formed at the end portions of the light-emitting tube 41 and are configured such that the electrodes and the internal lead rods 44 and 47 do not come into direct contact with the light-emitting tube 41 within the respective sealed portions 41A and 41B. Therefore, when the lamp emits light, although thermal expansion occurs in the pair of electrodes, the internal lead rods 44 and 47 and the conductive foils 51A and 51B, the thermal expansion can be absorbed by plastic deformation of the conductive foils 51A and 51B and thereby relaxed. The occurrence of breakage of the sealed portions 41A and 41B due to the difference in thermal expansion coefficient between the material of the electrodes, the material of the internal lead rods, the material of the conductive foils and the material of the light-emitting tube can thereby be suppressed.

Since the first electrode 43 is disposed in contact with the inner surface of the tube wall of the cylindrical tube 42, the cylindrical tube 42 can have large capacitance. Therefore, the pair of electrodes can be supplied with large electric power, so that the light-emitting space can be supplied with large electric power. Even when large electric power is supplied to the pair of electrodes, higher safety than that in an excimer lamp having a configuration in which the electrodes are disposed on the outer surface of the light-emitting tube can be obtained, because each of the pair of electrodes to which high voltage is applied is disposed inside the light-emitting tube 41 and is not exposed to the outside of the light-emitting tube 41.

The sealed portions 41A and 41B each have a foil seal structure. Therefore, even particularly when the sealed portion 41B has a configuration in which the other end of the cylindrical tube 42 is integrally connected therein, these sealed portions 41A and 41B can be easily formed by pinch sealing or shrink sealing.

In the second excimer lamp 40, since the other end of the cylindrical tube 42 is foil-sealed integrally with the light-emitting tube 41, the cylindrical tube 42 is held at a prescribed placement position inside the light-emitting tube 41. The members for supplying electric power to the first electrode 43, specifically the conductive foil 51B, the internal lead rod 44 and the external lead rod 45, are not exposed in the light-emitting space S inside the light-emitting tube 41, and therefore the occurrence of undesirable discharge in the light-emitting space S is prevented.

In the second excimer lamp 40, the first electrode 43 has a coil shape. Therefore, even when the area of contact between the first electrode 43 and the cylindrical tube 42 is increased to increase the capacitance of the cylindrical tube 42, thermal expansion generated in the first electrode 43 when the lamp emits light can be absorbed at least partially by the first electrode 43 itself, i.e., the coil shape. This can suppress the occurrence of breakage of the cylindrical tube 42 due to the difference in thermal expansion coefficient between the material of the electrodes and the material of the cylindrical tube. Therefore, the pair of electrodes can be supplied with much larger power.

In the second excimer lamp 40, since the second electrode 46 is spiraled so as to surround the cylindrical tube 42, dielectric barrier discharge is formed uniformly in the extending direction of the first electrode 43 (the left-right direction in FIGS. 9 and 10) and radially about the first electrode 43. In addition, the light generated in the light-emitting tube 41 through dielectric barrier discharge can be efficiently emitted to the outside of the light-emitting tube 41 through gaps between adjacent portions of the metal wire constituting the second electrode 46 over the entire circumference of the tube wall of the light-emitting tube 41. Therefore, a region around the light-emitting tube 41 can be irradiated with the light in a highly uniform manner. Since the electrode area of the second electrode 46 can be increased, the capacitance of the second electrode 46 can be increased, so that the pair of electrodes can be supplied with much larger electric power. In addition, even when the second electrode 46 is disposed in contact with the inner surface of the tube wall of the light-emitting tube 41, thermal expansion generated in the second electrode 46 when the lamp emits light can be absorbed at least partially by the second electrode 46 itself, i.e., the coil form. This can suppress the occurrence of breakage of the light-emitting tube 41 due to the difference in thermal expansion coefficient between the material of the electrodes and the material of the light-emitting tube.

In the second excimer lamp 40, the interior of the cylindrical tube 42 is reduced in pressure or filled with an inert gas, and oxidation of the first electrode 43 disposed inside the cylindrical tube 42 can thereby be prevented. By appropriately selecting the pressure inside the cylindrical tube 42 or the type of inert gas with which the cylindrical tube 42 is filled, the occurrence of discharge inside the cylindrical tube 42 can be suppressed. Therefore, additional power consumption caused by discharge inside the cylindrical tube 42 can be suppressed.

In the second excimer lamp 40, the interior of the cylindrical tube 42 is a hermetic space. Therefore, the interior of the cylindrical tube 42 can be easily reduced in pressure or filled with an inert gas without provision of additional means.

The second excimer lamp of the present invention is not limited to the above-described embodiment, and various modifications can be made thereto.

Figure 12:
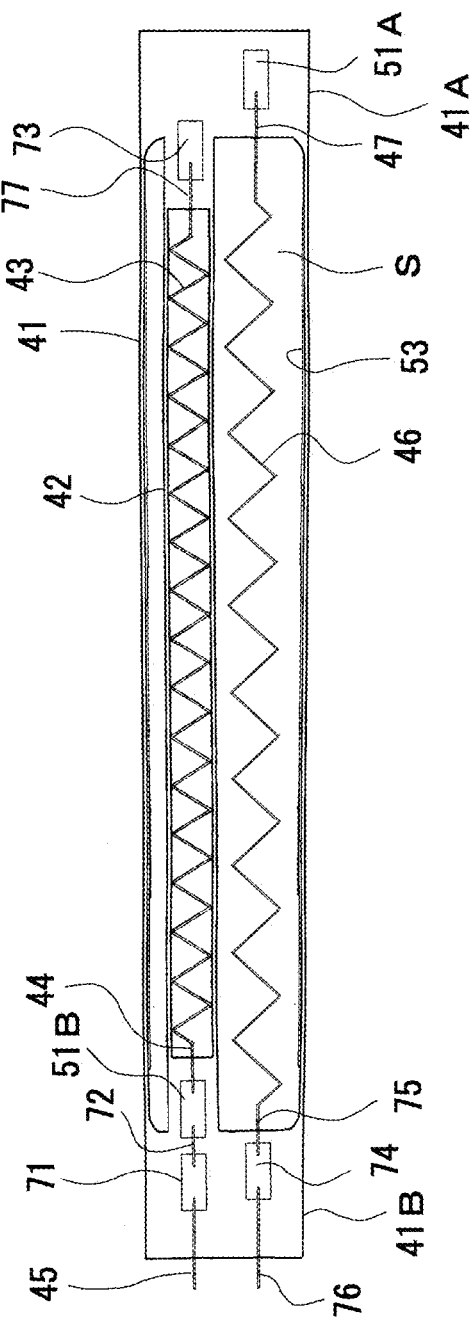
[FIG. 12] is an illustrative diagram showing the outline of still another exemplary configuration of the second excimer lamp of the present invention.
Figure 13:
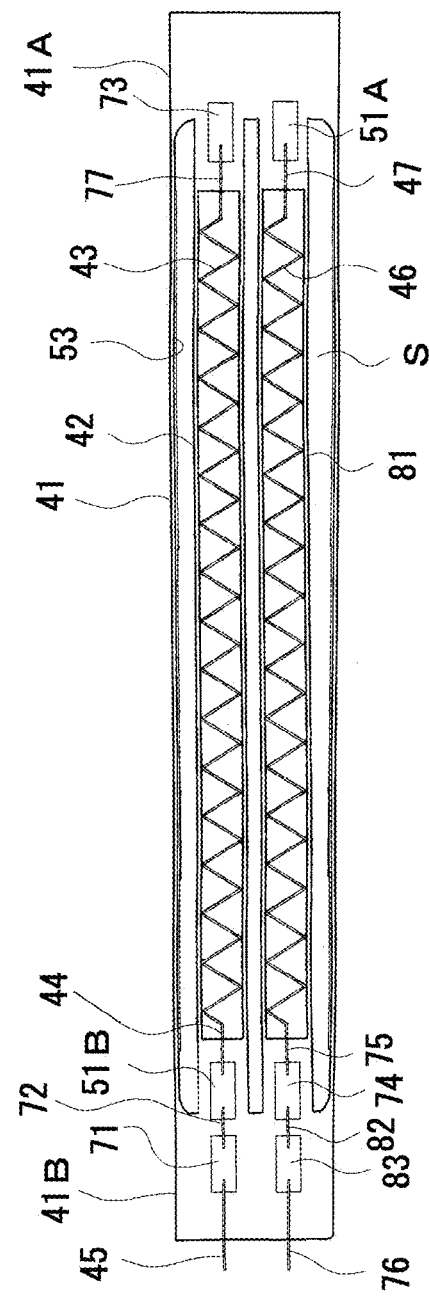
[FIG. 13] is an illustrative diagram showing the outline of yet another exemplary configuration of the second excimer lamp of the present invention.

For example, opposite ends of the cylindrical tube may be foil-sealed (see FIGS. 12 and 13) or may be foil-sealed integrally with the light-emitting tube (see FIGS. 12 and 13).

In the second excimer lamp, when the opposite ends of the cylindrical tube are foil-sealed integrally with the light-emitting tube, the cylindrical tube can be held at a prescribed placement position inside the light-emitting tube in a reliable manner even when the cylindrical tube is very long. In addition, even when, for example, vibration or shock is applied to the second excimer lamp from the outside, the occurrence of breakage of the cylindrical tube or the light-emitting tube can be suppressed.

In a hermetically sealed portion having a configuration in which an end portion of a cylindrical tube is foil-sealed integrally with the light-emitting tube, a conductive foil electrically connected to the first electrode through an internal lead rod (this conductive foil may be hereinafter referred to as a "first conductive foil") and a conductive foil electrically connected to the first conductive foil through a lead rod (this conductive foil may be hereinafter referred to as a "second conductive foil") may be hermetically embedded (see FIGS. 11 to 13).

In the hermetically sealed portion having the above configuration, the first conductive foil is used to seal the end portion of the cylindrical tube during production of the lamp, and the second conductive foil is used to seal an end portion of the light-emitting tube.

Figure 11:
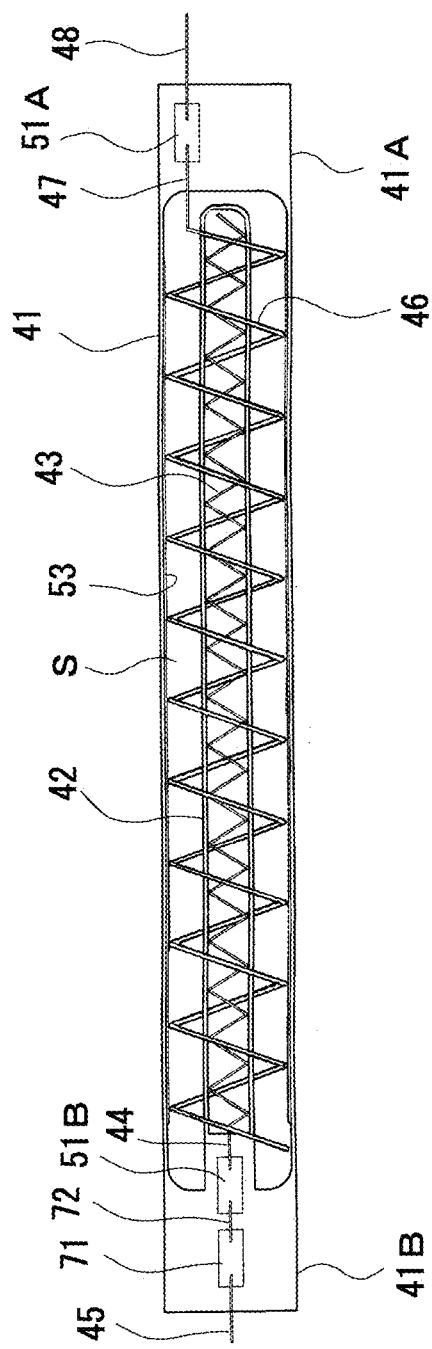
[FIG. 11] is an illustrative diagram showing the outline of another exemplary configuration of the second excimer lamp of the present invention.

As a method of forming the hermetically sealed portion in which the first conductive foil and the second conductive foil are embedded, a method of forming a sealed portion 41B in FIG. 11 will be specifically described as an example.

First, a cylindrical tube-electrode assembly having the following configuration is produced. One end of the cylindrical tube-electrode assembly is closed, and a hermetically sealed portion having a foil seal structure is formed at the other end by pinch sealing. The first electrode 43 is disposed inside the cylindrical tube-electrode assembly. In this cylindrical tube-electrode assembly, a first conductive foil 51B electrically connected to the first electrode 43 through an internal lead rod 44 is hermetically embedded in the hermetically sealed portion, and a lead rod 72 made of molybdenum and connected to the first conductive foil 51B is disposed so as to protrude outward from the hermetically sealed portion. A second conductive foil 71 is connected to the lead rod 72 in the obtained cylindrical tube-electrode assembly, and an external lead rod 45 is connected to the second conductive foil 71 to thereby produce a conductive foil-connected assembly. Then the conductive foil-connected assembly is inserted into a light-emitting tube-forming tubular material such that an end (the left end in FIG. 11) of the external lead rod 45 protrudes therefrom. While a portion of the conductive foil-connected assembly in which the hermetically sealed portion and the second conductive foil 71 are located is heated, pressure is applied to this portion from the outside to pinch this portion. The sealed portion 41B of the light-emitting tube 41 is thereby formed.

As described above, the sealed portion 41B has the following structure. The cylindrical tube 42 has the other end (the left end in FIG. 11) having a foil seal structure in which the first conductive foil 51B is hermetically embedded. The other end of the cylindrical tube 42, together with the lead rod 72 protruding from the other end of the cylindrical tube 42, is embedded in the other end (the left end in FIG. 11) of the light-emitting tube 11. The second conductive foil 71 is connected to the lead rod 72 embedded in the end of the light-emitting tube 41, whereby a foil seal structure is formed.

The pair of electrodes, i.e., the first electrode and the second electrode, may be arranged parallel to each other (see FIGS. 12 and 13).

In the second excimer lamp, when the pair of electrodes are arranged parallel to each other, the separation distance between the first electrode and the second electrode can be constant in the direction of the tube axis of the light-emitting tube, so that uniform discharge with no unevenness in the direction of the tube axis of the light-emitting tube can be obtained in the discharge space of the light-emitting tube.

The second electrode may be disposed inside a cylindrical tube, as is the first electrode (see FIG. 13). In this configuration, from the viewpoint of the capacitance of the cylindrical tube including the second electrode disposed thereinside, it is preferable that the second electrode is disposed in contact with the inner surface of the tube wall of the cylindrical tube. From the viewpoint of prevention of oxidization of the second electrode, it is preferable that the hermetic space inside the cylindrical tube including the second electrode disposed thereinside is reduced in pressure or filled with an inert gas.

In the second excimer lamp, when the first electrode and the second electrode are disposed in the hermetic spaces inside the cylindrical tubes, the pair of electrodes are not exposed in the light-emitting space, so that deterioration of the electrodes caused by exposure in the space in which discharge occurs can be suppressed. When an electrode structure including a cylindrical tube with the first electrode disposed therein and an electrode structure including a cylindrical tube with the second electrode disposed therein have the same configuration, the efficiency of production of the lamp can be improved.

Preferably, the first electrode has a coil shape, from the viewpoint of increasing the capacitance of the cylindrical tube and of suppressing the occurrence of breakage of the cylindrical tube caused by the difference in thermal expansion coefficient between the material of the electrodes and the material of the cylindrical tube. However, the first electrode used can have any of various shapes, so long as it can be disposed in the hermetic space of the cylindrical tube so as to extend along the tube axis of the cylindrical tube while in contact with the inner surface of the tube wall of the cylindrical tube.

As specific examples of the coil-shaped electrode constituting the first electrode, may be mentioned, in addition to the wire coil-shaped electrode in FIG. 1 configured by winding a metal wire into a coil shape, a band coil-shaped electrode configured by winding a metal band-shaped plate into a coil shape.

As specific examples of the electrode constituting the first electrode and having a shape other than the coil shape, may be mentioned: a band-shaped electrode configured such that a metal foil is disposed so as to cover the inner surface of the tube wall of the cylindrical tube; a film-like electrode configured such that a vapor-deposited film is disposed so as to cover the inner surface of the tube wall of the cylindrical tube; and a rod-shaped electrode configured such that a metal rod having an outer diameter conforming to the inner diameter of the cylindrical tube is inserted into the cylindrical tube.

The power supply mechanism may be configured such that electric power is supplied directly to the external lead rod electrically connected to the first electrode and the external lead rod electrically connected to the second electrode or configured such that electric power is supplied to the second excimer lamp through capacitive coupling with the first electrode connected to a high-frequency AC power source and the second electrode grounded.

When the power supply mechanism is configured to supply electric power through capacitive coupling, the second excimer lamp can have higher light-emission efficiency than that when a power supply mechanism configured to supply electric power through inductive coupling is used.

As specific examples of other embodiments of the second excimer lamp of the present invention, may be mentioned excimer lamps shown in FIGS. 11 to 13.

The same effects as those in the second excimer lamp 40 shown in FIGS. 9 and 10 can also be obtained in the second excimer lamps shown in FIGS. 11 to 13.

More specifically, in the second excimer lamps shown in FIGS. 11 to 13, high electric power can be supplied to the light-emitting space, and the occurrence of breakage of the ends of the light-emitting tube each having a hermetic seal structure formed therein is suppressed, so that long service life can be obtained. In addition, these second excimer lamps can be easily produced. Since no corrosion occurs in any use environment, high safety is obtained.

The second excimer lamp shown in FIG. 11 has the following configuration. Two conductive foils (specifically, the first conductive foil 51B and the second conductive foil 71) electrically connected to each other through the lead rod 72 made of molybdenum are embedded in the hermetically sealed portion (the sealed portion 41B) in which the other end (the left end in FIG. 11) of the cylindrical tube 42 is foil-sealed integrally with the light-emitting tube 41.

This second excimer lamp has the same configuration as the second excimer lamp 40 shown in FIGS. 9 and 10 except that the two conductive foils are embedded in the sealed portion 41B and that the second electrode 46 is directly connected to the internal lead rod 47 with no connection member 49 therebetween.

The second excimer lamp shown in FIG. 12 has a configuration in which the first electrode 43 and the second electrode 46 are arranged parallel to each other.

This second excimer lamp has the same configuration as the second excimer lamp 40 shown in FIGS. 9 and 10 except that the second electrode 46 is disposed parallel to the first electrode 43, that opposite ends of the cylindrical tube 42 are hermetically sealed, that opposite ends of the second electrode 46 are electrically connected to conductive foils 51A and 74 hermetically embedded in the sealed portions 41A and 41B through internal lead rods 47 and 75, and that an external lead rod 76 electrically connected to the second electrode 46 and the external lead rod 45 electrically connected to the first electrode 43 protrude outward from the sealed portion 41B.

In FIG. 12, numeral 77 represents an internal lead rod, and 73 represents a conductive foil.

The second excimer lamp shown in FIG. 13 has a configuration in which the second electrode 46 is disposed in a hermetic space of a cylindrical tube 81 and this cylindrical tube 81 and the cylindrical tube 42 including the first electrode 43 disposed therein are arranged parallel to each other.

This second excimer lamp has the same configuration as the second excimer lamp shown in FIG. 12 except that the second electrode 46 is disposed in the hermetic space inside the cylindrical tube 81. The cylindrical tube 81 has the same configuration as the cylindrical tube 42.

In FIG. 13, reference numeral 82 represents a lead rod for electrically connecting the conductive foil (first conductive foil) 74 and a conductive foil 83 (second conductive foil).

<Third Excimer Lamp>

Figure 14:
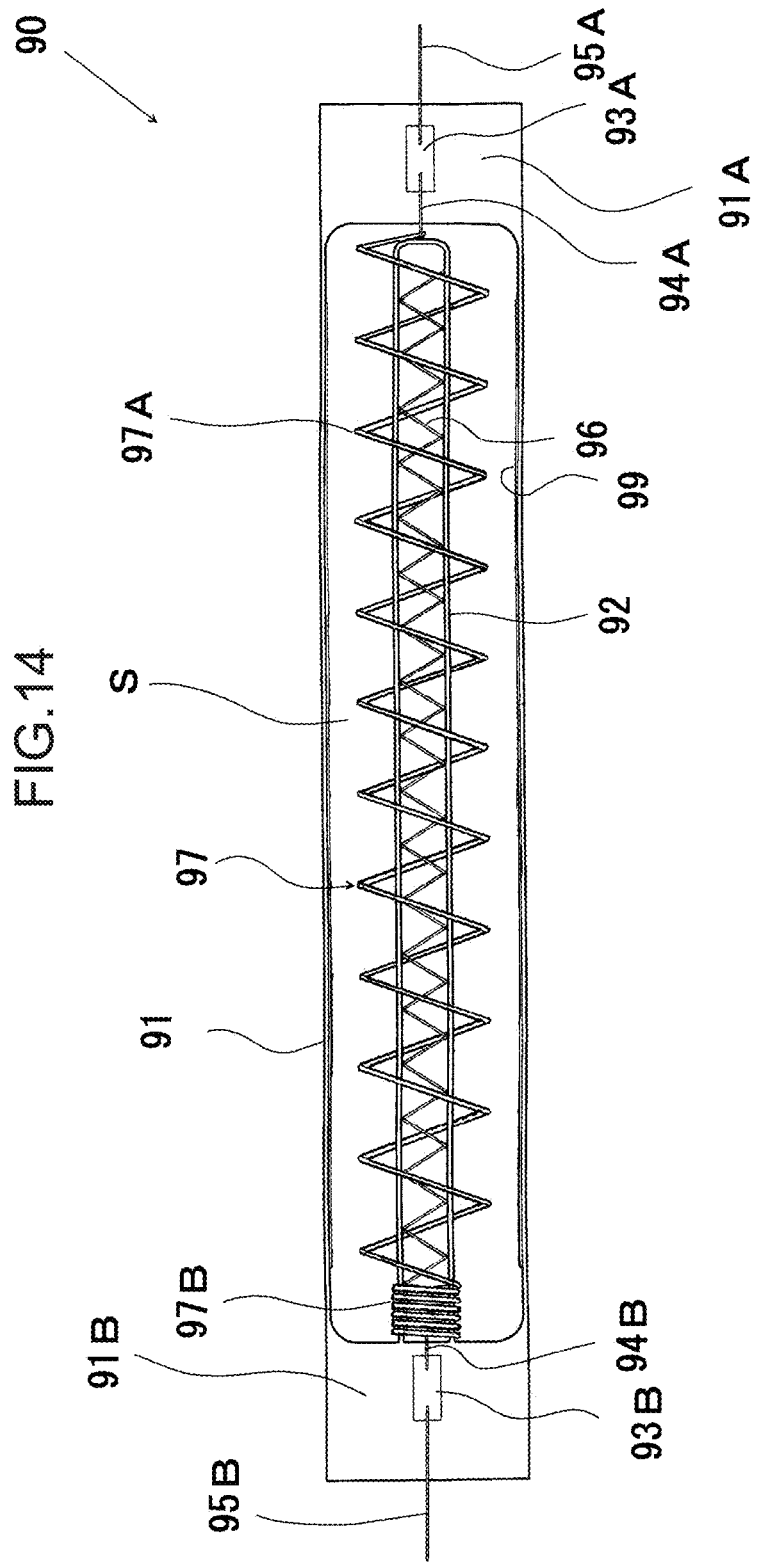
[FIG. 14] is an illustrative diagram showing the outline of an exemplary configuration of a third excimer lamp of the present invention.

FIG. 14 is an illustrative diagram showing the outline of an exemplary configuration of the third excimer lamp of the present invention.

The third excimer lamp 90 includes a substantially cylindrical light-emitting tube 91 having sealed portions 91A and 91B at opposite ends. The sealed portions 91A and 91B of the light-emitting tube 91 each have a foil seal structure in which a conductive foil 93A or 93B made of molybdenum is hermetically embedded.

A cylindrical tube 92 made of a dielectric material is disposed in the hermetically sealed interior of the light-emitting tube 91 so as to extend in the direction of the tube axis of the light-emitting tube 91 (the left-right direction in FIG. 14), and a first electrode 96 is disposed inside the cylindrical tube 92 so as to extend in the direction of the tube axis of the cylindrical tube 92. In the light-emitting tube 91, its light-emitting space S surrounded by the inner surface of the light-emitting tube 91 and the outer surface of the cylindrical tube 92 is filled with an excimer emission gas. A second electrode 97 is disposed in the light-emitting space S so as to extend along the center axis (tube axis) of the cylindrical tube 92, and the pair of electrodes constituting the third excimer lamp 90, specifically the first electrode 96 and the second electrode 97, are thereby disposed so as to face each other within the light-emitting tube 91.

In the example in this figure, the foil seal structures in the sealed portions 91A and 91B are formed by pinch sealing or shrink sealing.

The cylindrical tube 92 has a substantially cylindrical shape. One end (the right end in FIG. 14) of the cylindrical tube 92 is closed, and the other end (the left end in FIG. 14) is integrally connected to the inner end (the right end in FIG. 14) of the sealed portion 91B of the light-emitting tube 91. The cylindrical tube 92 is thereby hermetically sealed, and a hermetic space for placing the first electrode 96 is formed inside the cylindrical tube 92.

In the sealed portion 91B to which the other end of the cylindrical tube 92 is integrally connected, an internal lead rod 94B electrically connected to the first electrode 96 is connected to the conductive foil 93B, and the other end of the cylindrical tube 92 is thereby foil-sealed integrally with the light-emitting tube 91.

A method of foil-sealing the other end of the cylindrical tube 92 integrally is, for example, as follows. First, a cylindrical tube-electrode assembly is produced. One end of the cylindrical tube-electrode assembly is closed, and a hermetically sealed portion having a foil seal structure is formed at the other end by pinch sealing. The first electrode 96 is disposed inside the cylindrical tube-electrode assembly. Next, the obtained cylindrical tube-electrode assembly is inserted into a light-emitting tube-forming tubular material. While a portion of the light-emitting tube-forming tubular material at which the hermetically sealed portion of the cylindrical tube-electrode assembly is located is heated, pressure is applied to this portion from the outside to pinch this portion.

The first electrode 96 is composed of a coil-shaped electrode formed, for example, by spirally winding a metal wire.

This coil-shaped electrode is made of a metal material such as tungsten having electric conductive properties and heat resistance and is disposed on the center axis (tube axis) of the cylindrical tube 92 within the hermetic space inside the cylindrical tube 92. Specifically, the first electrode 96 is disposed such that its center axis coincides with the center axis (tube axis) of the cylindrical tube 92 and extends along the center axis of the cylindrical tube 92.

The first electrode 96 is disposed in contact with the inner surface of the cylindrical tube 92. More specifically, the coil-shaped wound metal wire constituting the first electrode 96 extends along the center axis (tube axis) of the cylindrical tube 92 while spiraling on the inner surface of the tube wall of the cylindrical tube 92 so as to surround the hermetic space in the cylindrical tube 92 and is disposed in intimate contact with the inner surface of the cylindrical tube 92.

The internal lead rod 94B made of molybdenum is connected to the other end (the left end in FIG. 14) of the first electrode 96, and the other end (the left end in FIG. 14) of the internal lead rod 94B extends into the other sealed portion 91B of the light-emitting tube 91 and is connected to the conductive foil 93B embedded in the sealed portion 91B by spot welding. An external lead rod 95B made of molybdenum is connected to the conductive foil 93B by spot welding, and the other end (the left end in FIG. 14) of the external lead rod 95B protrudes outward from the other sealed portion 91B.

Preferably, as in the second excimer lamp, the hermetic space inside the cylindrical tube 92 is reduced in pressure or filled with an inert gas.

When the hermetic space inside the cylindrical tube 92 is reduced in pressure, the pressure (the degree of vacuum) thereinside is preferably not higher than $10^{-3}$ Torr.

When the hermetic space inside the cylindrical tube 92 is filled with an inert gas, it is preferable to use, as the inert gas, a noble gas or nitrogen gas ($N_2$), as in the second excimer lamp.

When the hermetic space inside the cylindrical tube 92 is filled with an inert gas, it is preferable that the pressure (gas pressure) inside the cylindrical tube 92 is equal to or higher than the pressure (gas pressure) inside the light-emitting space S.

The dielectric material constituting the cylindrical tube 92 may not allow light generated in the light-emitting space S inside the light-emitting tube 91 to pass through, as in the second excimer lamp.

When an end of the cylindrical tube 92 (the other end of the cylindrical tube 92 in FIG. 14) is foil-sealed integrally with the light-emitting tube 91 as shown in FIG. 14, it is preferable that the dielectric material constituting the cylindrical tube 92 has a thermal expansion coefficient equal to that of the material constituting the light-emitting tube 91, as in the second excimer lamp.

In the example in this figure, the cylindrical tube 92 is made of the same material as that constituting the light-emitting tube 91.

The second electrode 97 is composed of, for example, a coil-shaped electrode formed from a metal wire. The coil-shaped electrode has: a small-diameter portion 97B spirally wound around the other end portion (the left end portion in FIG. 14) of the cylindrical tube 92 so as to be in intimate contact with the outer surface of the other end portion; and a large-diameter portion 97A extending continuously from the small-diameter portion 97B and spirally wound so as to be spaced apart from the outer surface of a portion of the cylindrical tube 92 other than the other end portion.

The coil-shaped electrode is made of a material such as tungsten having electric conductive properties and heat resistance and is disposed on the center axis (tube axis) of the light-emitting tube 91 within the light-emitting space S of the light-emitting tube 91. Specifically, the second electrode 97 is disposed such that its center axis coincides with the center axis (tube axis) of the light-emitting tube 91 and extends along the center axis of the light-emitting tube.

Figure 15:
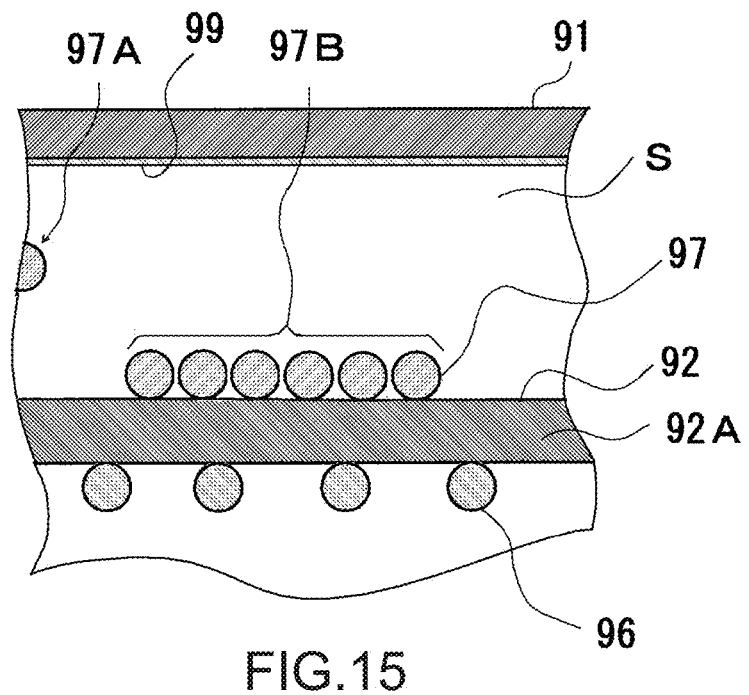
[FIG. 15] is a cross-sectional view for explaining an intimate contact region in the excimer lamp in [FIG. 14].

The small-diameter portion 97B of the second electrode 97 has an inner diameter (coil inner diameter) conforming to the outer diameter of the cylindrical tube 92. Therefore, the small-diameter portion 97B is disposed such that the spirally wound metal wire extends along the center axis (tube axis) of the cylindrical tube 92 while spiraling on the outer surface of the cylindrical tube 92 so as to surround the cylindrical tube 92 and is disposed in intimate contact with the outer surface of the cylindrical tube 92, as shown in FIG. 15.

In the small-diameter portion 97B, an intimate contact region extending in the length direction of the second electrode 97 (the left-right direction in FIG. 14) is formed. In the intimate contact region, the first electrode 96 and the second electrode 97 face each other in at least one portion through a tube wall 92A of the cylindrical tube 92, as shown in FIG. 15.

More specifically, the other end portion (the left end portion in FIG. 14) of the first electrode 96 is located inside the other end portion of the cylindrical tube 92 that forms the intimate contact region, and the metal wire constituting the other end portion of the first electrode 96 and the metal wire constituting the small-diameter portion 97B of the second electrode 97 cross each other in at least one portion through the tube wall 92A of the cylindrical tube 92.

Figure 16:
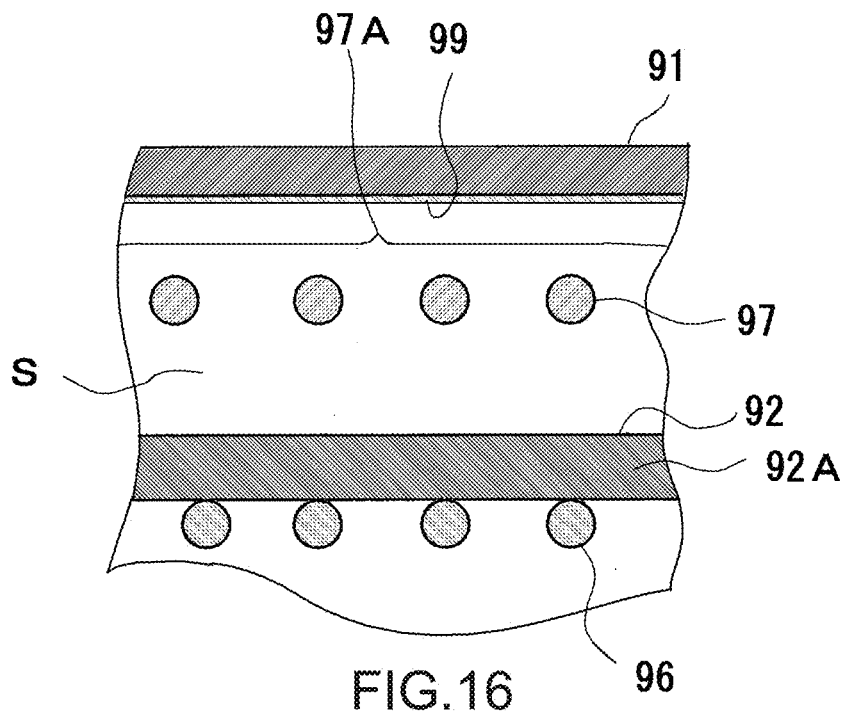
[FIG. 16] is a cross-sectional view for explaining a region other than the intimate contact region in the excimer lamp in FIG. 14.

The large-diameter portion 97A of the second electrode 97 has an inner diameter (coil inner diameter) larger than the outer diameter of the cylindrical tube 92. Therefore, the large-diameter portion 97A is disposed such that the spirally wound metal wire is spiraled in a region around the cylindrical tube 92 so as to surround the cylindrical tube 92 with the large-diameter portion 97A spaced apart from the outer surface of the cylindrical tube 92 through the light-emitting space S, i.e., with the tube wall 92A of the cylindrical tube 92 and the light-emitting space S interposed between the large-diameter portion 97A and the first electrode 96, as shown in FIG. 16.

Therefore, the space interposed between the second electrode 97 and the outer surface of the cylindrical tube 92 within a region other than the intimate contact region, specifically a region formed by the large-diameter portion 97A, forms an excimer discharge space for generating dielectric barrier discharge. Preferably, the separation distance between the large-diameter portion 97A of the second electrode 97 and the outer surface of the cylindrical tube 92 is as large as possible within a structurally permissible range. The amount of light generated by dielectric barrier discharge can be increased as the separation distance between the second electrode 97 and the large-diameter portion 97A increases.

Preferably, the coil pitch of the large-diameter portion 97A of the coil-shaped electrode constituting the second electrode 97 is larger than the coil pitch of the coil-shaped electrode constituting the first electrode 96, i.e., the coil pitch of the first electrode 96 is smaller than the coil pitch of the large-diameter portion 97A of the second electrode 97.

This is because, by increasing the coil pitch of the large-diameter portion 97A of the second electrode 97 as much as possible, blocking of light, generated in the light-emitting tube 91, by the second electrode 97 can be suppressed and because, by reducing the coil pitch of the first electrode 96, the electric capacity between the first electrode 96 and the second electrode 97 can be increased to thereby allow the third excimer lamp 90 to have large radiant intensity.

Specific examples of the coil pitches of the first electrode 96 and the large-diameter portion 97A of the second electrode 97 are 2 mm for the coil pitch of the first electrode 96 and 10 mm for the coil pitch of the large-diameter portion 97A of the second electrode 97.

An internal lead rod 94A made of molybdenum is connected to one end (the right end in FIG. 14) of the second electrode 97, and one end (the right end in FIG. 14) of the internal lead rod 94A extends into the sealed portion 91A and is connected to the conductive foil 93A by spot welding. An external lead rod 95A made of molybdenum is connected to the conductive foil 93A by spot welding, and one end (the right end in FIG. 14) of the external lead rod 95A protrudes outward from the sealed portion 91A.

The material constituting the light-emitting tube 91 may be any of various materials that can transmit light generated in the light-emitting space S inside the light-emitting tube 91, as in the second excimer lamp.

The excimer emission gas used is a noble gas having the function as a discharge medium that generates an excimer by dielectric barrier discharge, as in the first and second excimer lamps. If necessary, a halogen gas is used together with the noble gas.

The type of noble gas sealed in the light-emitting space S inside the light-emitting tube 91 as the excimer emission gas and the type of halogen gas sealed as needed are appropriately selected according to the wavelength of light that is required to be emitted from the third excimer lamp 90.

In the third excimer lamp 90, as in the first and second excimer lamps, a phosphor layer 99 containing a phosphor that emits ultraviolet rays when it receives excimer light as excitation light may be disposed on the inner surface of the tube wall of the light-emitting tube 91 over a region in which the first electrode 96 and the second electrode 97 are disposed, as shown in FIG. 14.

Any known phosphor that emits ultraviolet rays when it receives excimer light as excitation light can be appropriately used as the phosphor constituting the phosphor layer 99 according to, for example, the application of the third excimer lamp 90.

As in the first and second excimer lamps, when the phosphor in the phosphor layer 99 has low adhesion to the material constituting the light-emitting tube 91 (for example, fused quartz glass), it is preferable to use a binder between the phosphor layer 99 and the light-emitting tube 91, in order to obtain high adhesion between the phosphor layer 99 and the light-emitting tube 91.

An example of the specifications of the third excimer lamp 90 configured as described above is as follows. The light-emitting tube 91 has an outer diameter of 16 mm, an inner diameter of 14 mm and an overall length of 180 mm. The cylindrical tube 92 has an outer diameter of 4 mm, an inner diameter of 2 mm and an overall length of 150 mm. The conductive foils 93A and 93B are each a molybdenum foil.

The coil-shaped electrode constituting the first electrode 96 is formed from a tungsten wire having a wire diameter of 0.36 mm and has an outer diameter (coil diameter) of 2 mm, a coil pitch of 4.7 mm and an overall length of 130 mm.

The coil-shaped electrode constituting the second electrode 97 is formed from a tungsten wire having a wire diameter of 0.36 mm and includes: the large-diameter portion 97A having an inner diameter (coil inner diameter) of 12 mm, a coil pitch of 10 mm and an overall length (an overall length of the large-diameter portion) of 150 mm; and the small-diameter portion 97B having an inner diameter (coil inner diameter) of 4 mm, a coil pitch of 0.5 mm and an overall length (an overall length of the small-diameter portion) of 5 mm.

Xenon gas and neon gas used as excimer emission gas are sealed in the light-emitting space S of the light-emitting tube 91 at a pressure of 40 kPa, and nitrogen gas is sealed in the hermetic space of the cylindrical tube 92 at a pressure of 50 kPa. Rectangular wave AC power is supplied between the first electrode 96 and the second electrode 97 under the conditions of a rated frequency of 65 kHz and a rated voltage of 3.5 $kV_{p-p}$.

In the third excimer lamp 90 described above, the first electrode 96 is disposed in the hermetic space inside the cylindrical tube 92 made of a dielectric material within the light-emitting tube 91, and the second electrode 97 is disposed in the light-emitting space S so as to face the first electrode 96. Therefore, when high-frequency AC power is supplied from a high-frequency AC power source, dielectric barrier discharge occurs in the excimer discharge space in the light-emitting space S. Then an excimer is formed by the dielectric barrier discharge, and light emitted from the excimer (for example, vacuum-ultraviolet light) excites the phosphor constituting the phosphor layer 99, whereby light (for example, light having a wavelength of 190 to 400 nm) having a wavelength longer than that of the above light (for example, vacuum-ultraviolet light) is emitted through the phosphor layer 99 and the light-emitting tube 91.

In the intimate contact region formed by the small-diameter portion 97B of the second electrode 97 within the light-emitting space S of the third excimer lamp 90, a portion in which the first electrode 96 and the second electrode 97 face each other with almost no insulating space therebetween formed near a portion in which the first electrode 96 and the second electrode 97 face each other through the tube wall 92A of the cylindrical tube 92 (this portion may be hereinafter referred to also as a "facing portion") is formed, as shown in FIG. 15. In this facing portion, since only a very small insulating space is present, the breakdown voltage necessary for causing dielectric breakdown is small, and therefore priming discharge is easily generated. The generated priming discharge allows discharge to be initiated over the entire region between the first electrode 96 and the second electrode 97.

Therefore, in the third excimer lamp 90, priming discharge can be generated in the intimate contact region using a small voltage, and the generated priming discharge allows dielectric barrier discharge to be generated over the entire region between the first electrode 96 and the second electrode 97. Thus, a large starting voltage is not required, and excellent startability can thereby be obtained.

Specifically, in the third excimer lamp 90, the voltage required for the capacitance based on the thickness of the tube wall 92A of the cylindrical tube 92 and the breakdown voltage determined using a Paschen curve based on the thickness of the insulating space interposed between the second electrode 97 and the outer surface of the cylindrical tube 92 in the facing portion are required as the starting voltage. Therefore, dielectric barrier discharge can be started only through capacitive coupling and dielectric breakdown in a small gap.

More specifically, in the third excimer lamp 90, the starting voltage can be reduced by about 200 to about 500 V as compared to that in an excimer lamp having a configuration in which a coil-shaped electrode configured not to have the small-diameter portion 97B for forming the intimate contact region is provided instead of the second electrode 97.

The sealed portions 91A and 91B each having a foil seal structure are formed in the end portions of the light-emitting tube 91, and the electrodes and the internal lead rods 94A and 94B are not in direct contact with the light-emitting tube 91 in the sealed portions 91A and 91B. Therefore, when the lamp emits light, although thermal expansion occurs in the pair of electrodes, the internal lead rods 94A and 94B and the conductive foils 93A and 93B, the thermal expansion can be absorbed by plastic deformation of the conductive foils 93A and 93B and thereby relaxed. Therefore, the occurrence of breakage of the sealed portions 91A and 91B due to the difference in thermal expansion coefficient between the material of the electrodes, the material of the internal lead rods, the material of the conductive foils and the material of the light-emitting tube can thereby be suppressed.

In the third excimer lamp 90, the second electrode 97 is spaced a large distance from the outer surface of the cylindrical tube 92 in a region other than the intimate contact region formed by the large-diameter portion 97A as shown in FIG. 16, and the space interposed between the second electrode 97 and the outer surface of the cylindrical tube 92 forms an excimer discharge space having a large thickness. Therefore, large radiant intensity can be obtained without loss of favorable startability.

In the third excimer lamp 90, both the first electrode 96 and the second electrode 97 constituting a pair of electrodes are disposed inside the light-emitting tube 91, so the electrodes to which high voltage is applied are not exposed to the outside of the light-emitting tube 91. Since the pair of electrodes do not come into contact with gas, liquid, etc. that is present outside the light-emitting tube 91 even according to the use environment, no harmful effects occur which are caused when the electrodes for obtaining dielectric barrier discharge are exposed to the outside of the light-emitting tube 91.

In the third excimer lamp 90, the small-diameter portion 97B of the second electrode 97 has the function of positioning and holding the second electrode 97, and therefore the second electrode 97 can be held at a prescribed placement position in the light-emitting space S inside the light-emitting tube 11 in a prescribed state. Therefore, the uniformity of the discharge distance between the first electrode 96 and the second electrode 97 can be improved.

In the third excimer lamp 90, the large-diameter portion 97A of the second electrode 97 is spiraled so as to surround the cylindrical tube 92. Therefore, dielectric barrier discharge is formed uniformly in the extending direction of the first electrode 96 (the left-right direction in FIG. 14) and radially about the first electrode 96. In addition, the light generated in the light-emitting tube 91 through dielectric barrier discharge can be efficiently emitted to the outside of the light-emitting tube 91 through gaps between adjacent portions of the metal wire constituting the large-diameter portion 97A of the second electrode 97 over the entire circumference of the tube wall of the light-emitting tube 91. Therefore, a region around the light-emitting tube 91 can be irradiated with the light in a highly uniform manner.

The third excimer lamp of the present invention is not limited to the above-described embodiment, and various modifications can be made thereto.

Figure 17:
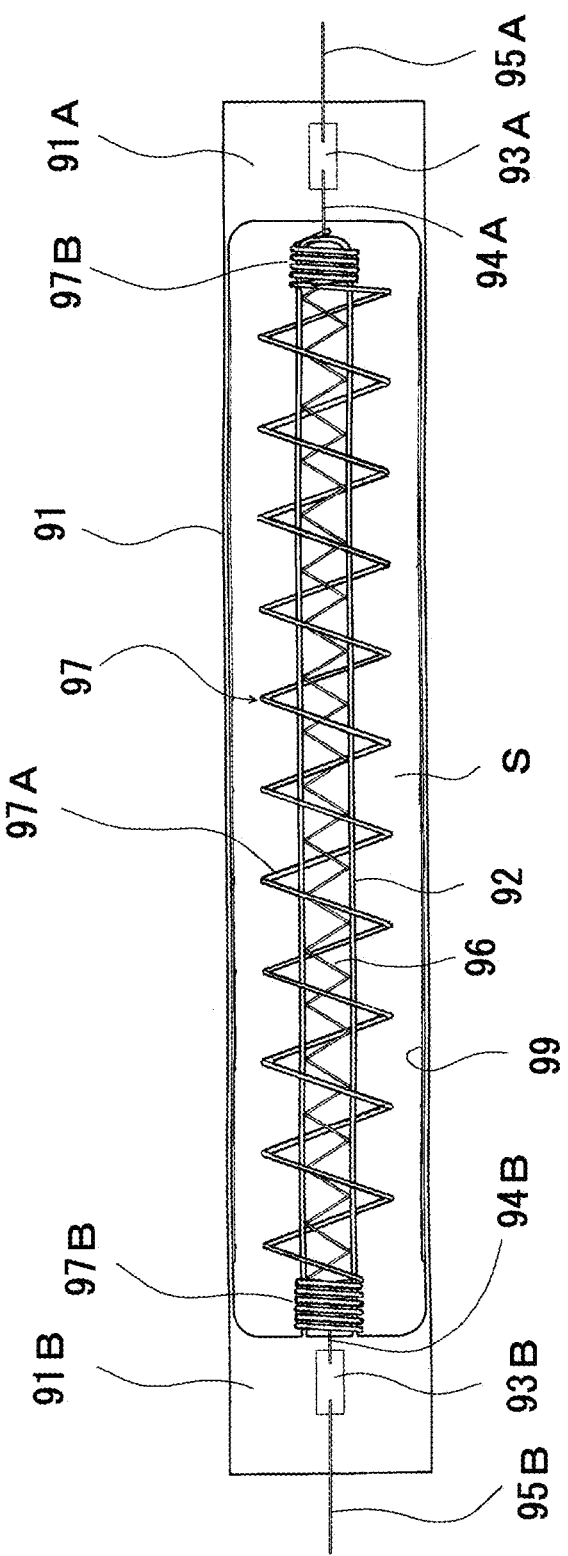
[FIG. 17] is an illustrative diagram showing the outline of another exemplary configuration of the third excimer lamp of the present invention.
Figure 18:
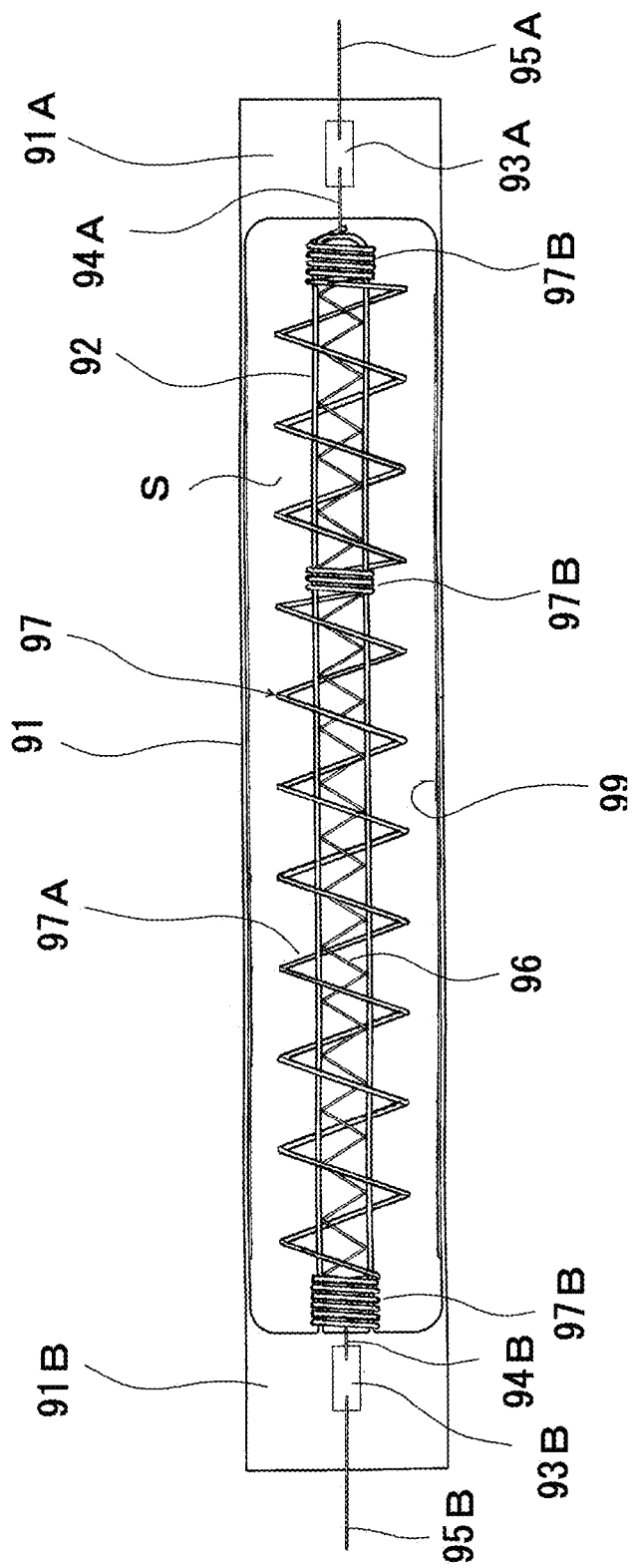
[FIG. 18] is an illustrative diagram showing the outline of still another exemplary configuration of the third excimer lamp of the present invention.

For example, the second electrode may have a plurality of small-diameter portions 97B, and each of the plurality of small-diameter portions 97B may form an intimate contact region having a portion in which the first electrode 96 and the second electrode 97 face each other through the tube wall 92A of the cylindrical tube 92, as shown in FIGS. 17 and 18.

Each of the third excimer lamps shown in FIGS. 17 and 18 has the same configuration as the third excimer lamp 90 shown in FIG. 14 except that the second electrode 97 has a plurality of small-diameter portions 97B and that the plurality of small-diameter portions 97B form intimate contact regions.

In the third excimer lamps configured as described above, each small-diameter portion 97B has the function of positioning and holding the second electrode 97. Therefore, as the number of small-diameter portions 97B increases, the second electrode 97 can be held at a prescribed placement position in the light-emitting space S inside the light-emitting tube 91 in a prescribed state in a more reliable manner, so the uniformity of the discharge distance between the first electrode 96 and the second electrode 97 can be improved.

The second electrode may be in contact with the inner surface of the light-emitting tube in at least part of the region other than the intimate contact region.

Figure 19:
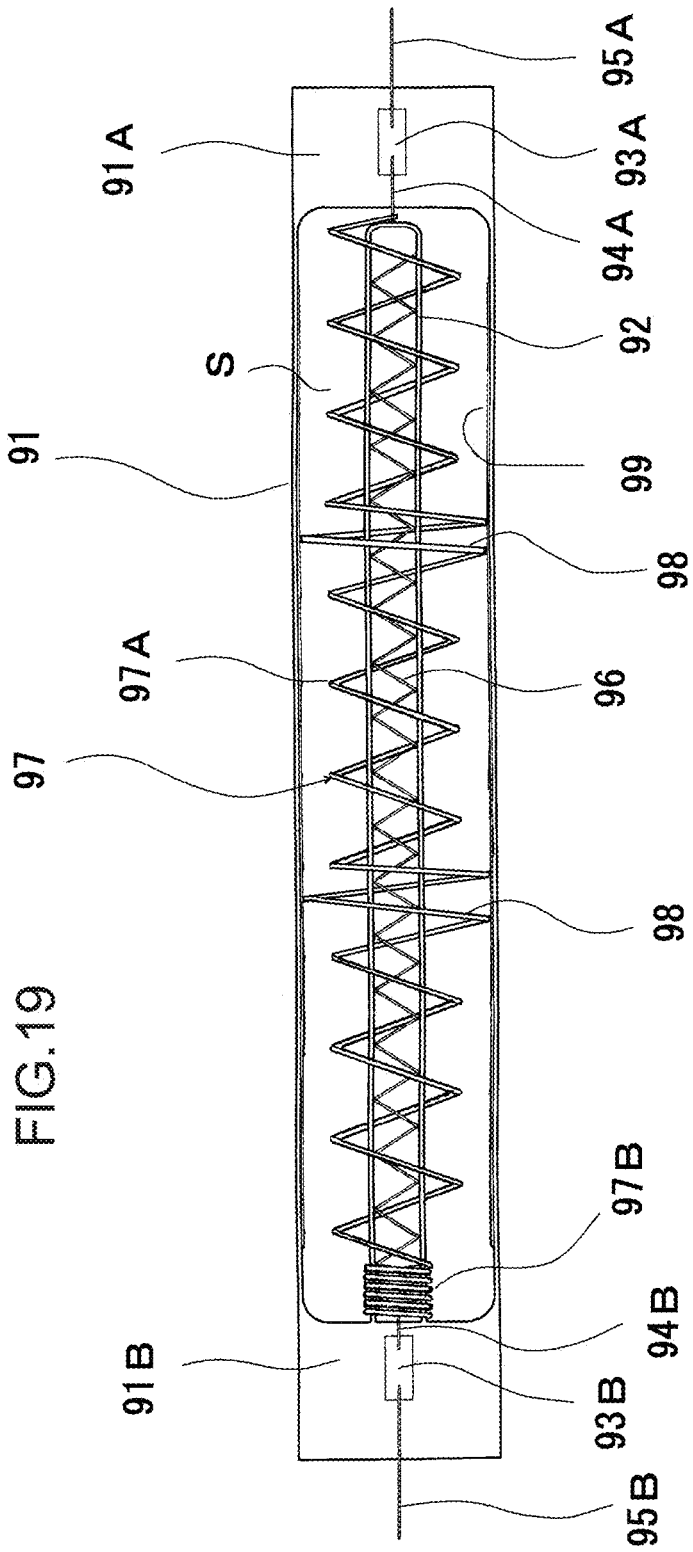
[FIG. 19] is an illustrative diagram showing the outline of yet another exemplary configuration of the third excimer lamp of the present invention.

Specifically, the second electrode in the entire region other than the intimate contact region may be in contact with the inner surface of the light-emitting tube or the surface of the phosphor layer 99 provided as needed. As shown in FIG. 19, the second electrode may be in contact with the inner surface of the light-emitting tube 91 or the surface of the phosphor layer 99 provided as needed at one portion or a plurality of portions (two portions in FIG. 19).

The third excimer lamp shown in FIG. 19 has the same configuration as the third excimer lamp 90 shown in FIG. 14 except that the second electrode 97 is in contact with the surface of the phosphor layer 99 at partial regions 98 formed in the large-diameter portion 97A.

In the third excimer lamp configured as described above, each portion in contact with the inner surface of the light-emitting tube has the function of positioning and holding the second electrode, and therefore the second electrode can be held at a prescribed placement position in the light-emitting space inside the light-emitting tube in a prescribed state. Particularly when the entire region of the second electrode other than the intimate contact region is in contact with the inner surface of the light-emitting tube, the first electrode is spaced a large distance from the second electrode, and therefore the thickness of the excimer discharge space becomes large, so large radiant intensity can be obtained.

Figure 20:
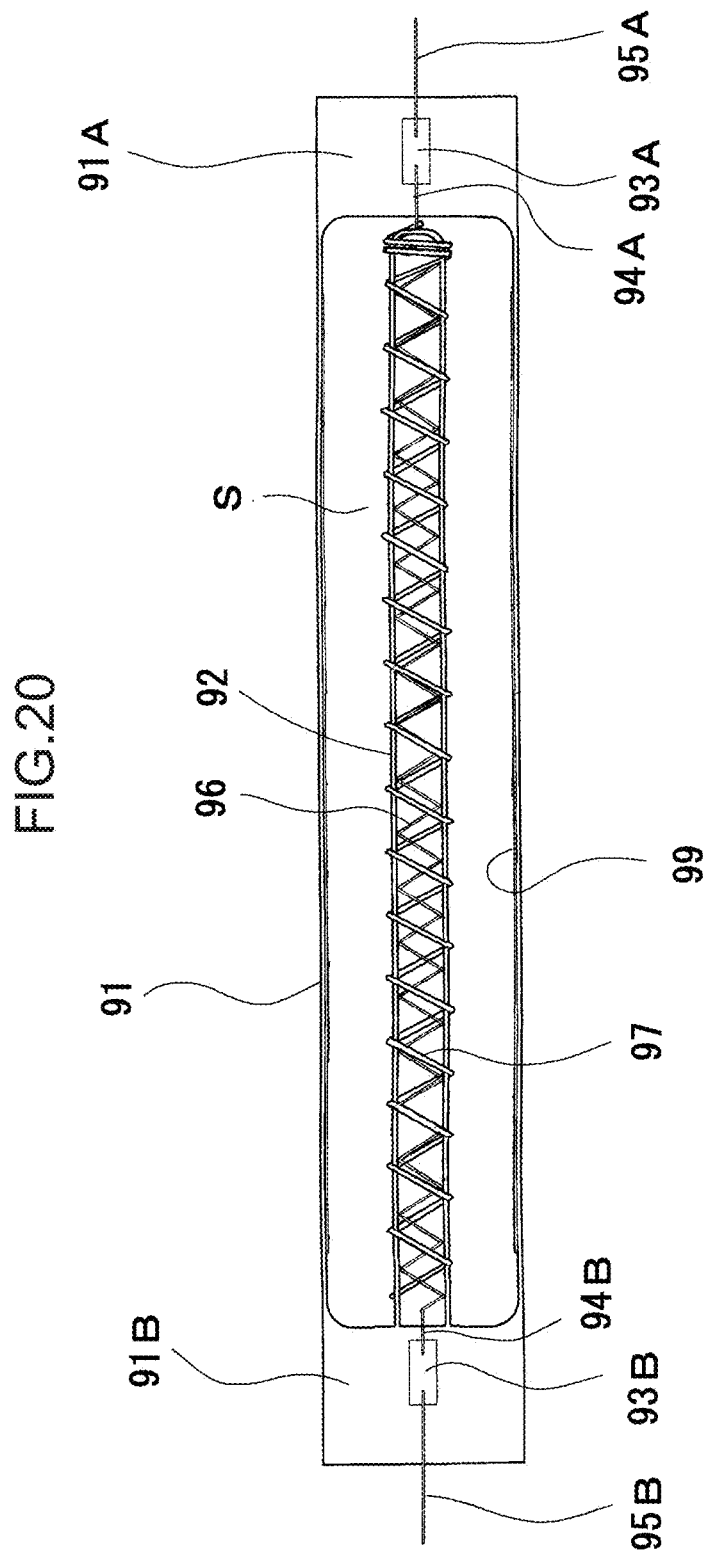
[FIG. 20] is an illustrative diagram showing the outline of further another exemplary configuration of the third excimer lamp of the present invention.

The second electrode 97 may be disposed in contact with the outer surface of the tube wall of the cylindrical tube 92 over the entire lengthwise region, and an intimate contact region having a facing portion in which the first electrode 96 and the second electrode 97 face each other through the tube wall 92A of the cylindrical tube 92 may be formed over the entire lengthwise region, as shown in FIG. 20.

The third excimer lamp shown in FIG. 20 has the same configuration as the third excimer lamp 90 shown in FIG. 14 except that the intimate contact region is formed over the entire lengthwise region of the second electrode 97.

In the third excimer lamp including the second electrode configured as described above, excimer light can be obtained by utilizing discharge generated along the outer surface of the cylindrical tube 92.

In the third excimer lamp configured as described above, since no large insulating space is present between the first electrode 96 and the second electrode 97 over the entire region, very high startability can be obtained. In addition, since the second electrode 97 can be held at a prescribed placement position in the light-emitting space S inside the light-emitting tube 91 in a prescribed state in a reliable manner, the uniformity of the discharge distance between the first electrode 96 and the second electrode 97 can be improved.

From the viewpoint of increasing the capacitance of the cylindrical tube and suppressing the occurrence of breakage of the cylindrical tube due to the difference in thermal expansion coefficient between the material of the electrodes and the material of the cylindrical tube, it is preferable that the first electrode has a coil shape. However, the first electrode used may have any of various shapes.

As specific examples of the coil-shaped electrode, may be mentioned, in addition to the wire coil-shaped electrode in FIG. 14 configured by winding a metal wire into a spiral shape, a band coil-shaped electrode configured by winding a metal band-shaped plate into a spiral shape.

As specific examples of the electrode having a shape other than the coil shape and disposed inside the cylindrical tube, may be mentioned: a band-shaped electrode configured such that a metal foil is disposed so as to cover the inner surface of the tube wall of the cylindrical tube; a film-like electrode configured such that a vapor-deposited film is disposed so as to cover the inner surface of the tube wall of the cylindrical tube; and a rod-shaped electrode configured such that a metal rod having an outer diameter conforming to the inner diameter of the cylindrical tube is inserted into the cylindrical tube.

The power supply mechanism may be configured to supply electric power to the third excimer lamp through inductive coupling or capacitive coupling.

When the power supply mechanism is configured to supply electric power through inductive coupling, the power supply members can be disposed so as not to be exposed to the outside, and this is advantageous in safety. When the power supply mechanism is configured to supply electric power through capacitive coupling, the excimer lamp can have higher light-emission efficiency than that when a power supply mechanism configured to supply electric power through inductive coupling is used.

An Experimental Example performed to examine the operational advantage of the third excimer lamp of the present invention will next be described.

EXPERIMENTAL EXAMPLE 1

First, a third excimer lamp having the configuration in FIG. 14 (this third excimer lamp may hereinafter be referred to as an "excimer lamp (1)") was produced.

In the produced excimer lamp (1), the light-emitting tube 91 had an outer diameter of 18 mm, an inner diameter of 16 mm and an overall length of 200 mm, and the cylindrical tube 92 had an outer diameter of 4 mm, an inner diameter of 2 mm and an overall length of 170 mm. The conductive foils 93A and 93B were each a molybdenum foil.

The coil-shaped electrode constituting the first electrode 96 was formed from a tungsten wire having a wire diameter of 0.36 mm and had an outer diameter (coil outer diameter) of 2 mm, a coil pitch of 4.7 mm and an overall length of 150 mm.

The coil-shaped electrode constituting the second electrode 97 was formed from a tungsten wire having a wire diameter of 0.36 mm and included: a large-diameter portion 97A having an inner diameter (coil inner diameter) of 14 mm, a coil pitch of 10 mm and an overall length (overall length of the large-diameter portion) of 170 mm; and a small-diameter portion 97B having an inner diameter (coil inner diameter) of 4 mm, a coil pitch of 0.5 mm and an overall length (overall length of the small-diameter portion) of 5 mm.

Xenon gas and neon gas used as excimer emission gas were sealed in the light-emitting space S of the light-emitting tube 91 at a pressure of 40 kPa, and nitrogen gas was sealed in the hermetic space of the cylindrical tube 92 at a pressure of 50 kPa. Rectangular wave AC power was supplied between the first electrode 96 and the second electrode 97 under the conditions of a rated frequency of 65 kHz and a rated voltage of 3.5 $kV_{p-p}$.

Next, a third excimer lamp having the same configuration as the excimer lamp (1) except that a coil-shaped electrode having no small-diameter portion for forming an intimate contact region was used instead of the second electrode 97 used in the excimer lamp (1) was produced (this third excimer lamp may be hereinafter referred to as a comparative excimer lamp (1)").

For each of the produced excimer lamp (1) and comparative excimer lamp (1), their starting voltage was checked. The starting voltage of the excimer lamp (1) was 1,200 V, and the starting voltage of the comparative excimer lamp (1) was 1,600 V.

Each of the first, second and third excimer lamps of the present invention is a discharge lamp that utilizes an excimer generated from excimer emission gas by discharge to obtain radiation light. Therefore, unlike a discharge lamp using mercury as a light-emitting material, the light-emission characteristics do not vary significantly according to the temperature in the use environment, so a stable light emission state can be obtained in any use environment. In addition, since the pair of electrodes are not exposed to the outside of the light-emitting tube, the pair of electrodes do not come into contact with gas, liquid, etc. that is present outside the light-emitting tube according to the use environment, so high safety can be obtained. Therefore, the first, second and third excimer lamps can be suitably used as light sources of water treatment apparatuses for performing so-called sterilization to decompose organic materials contained in water or to kill germs contained in water and light sources of various apparatuses such as air treatment apparatuses for air sterilization treatment, optical cleaning apparatuses for liquid crystal substrates and photo-curing apparatuses.

The case in which an excimer lamp of the present invention is used as a light source of a water treatment apparatus will be specifically described using a figure.

Figure 21:
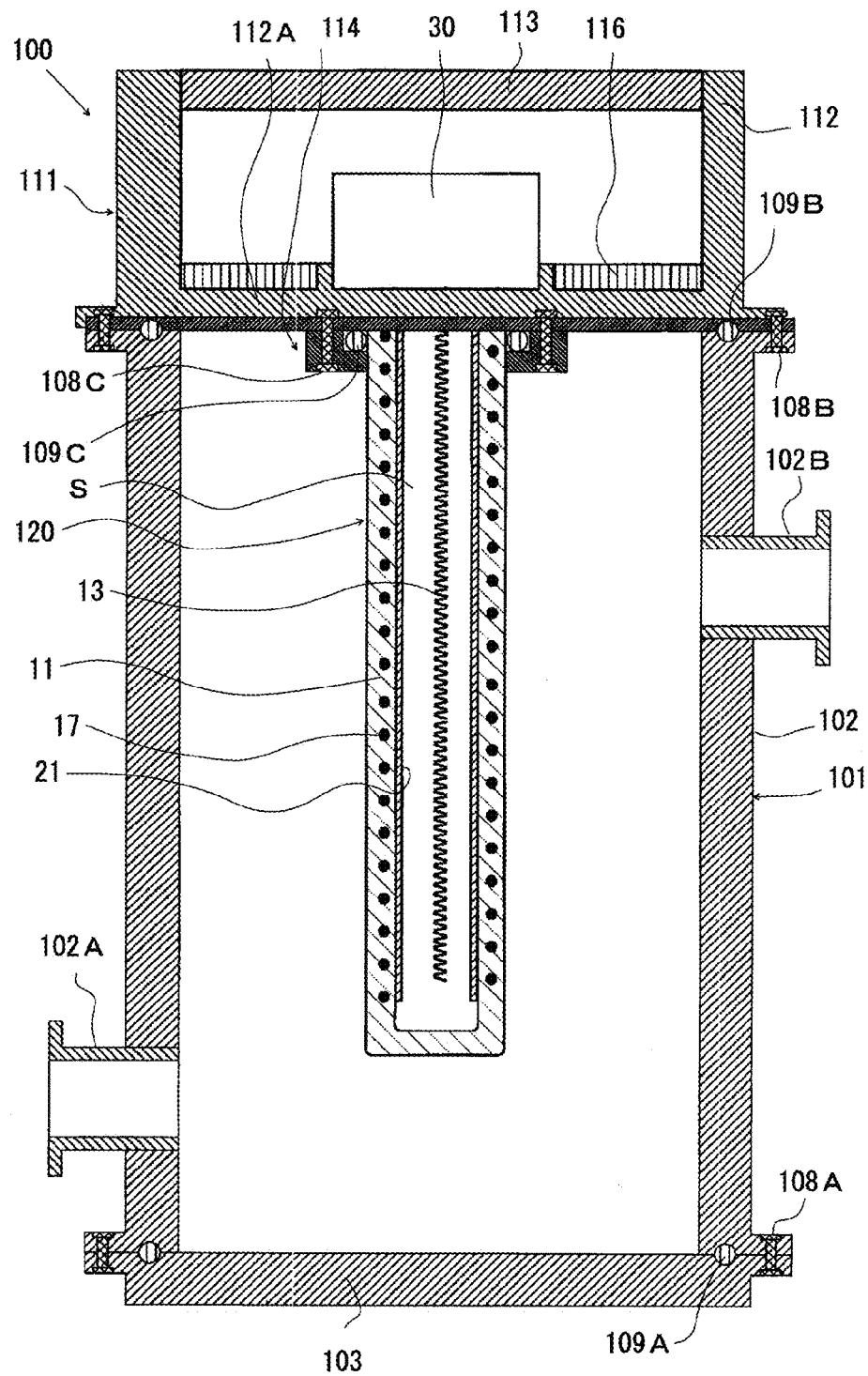
[FIG. 21] is a cross-sectional view for explaining an exemplary configuration of a water treatment apparatus including the first excimer lamp of the present invention as a light source.

FIG. 21 is a cross-sectional view for explaining an exemplary configuration of the water treatment apparatus including the first excimer lamp of the present invention as a light source.

The first excimer lamp 120 used as the light source of the water treatment apparatus 100 has the same configuration as the first excimer lamp 10 in FIG. 1 except that the supporter, getter and getter accommodation space in the first excimer lamp 10 in FIG. 1 are not provided in the light-emitting tube 11. A socket 30 is attached to one end (the upper end in FIG. 21) of the first excimer lamp 120.

The wavelength of light (ultraviolet rays) that is required to be emitted from the first excimer lamp 120 varies depending on the application of the water treatment apparatus 100. For example, when the water treatment apparatus 100 is used to decompose organic materials contained in water, it is preferable that the first excimer lamp 120 emits light having a wavelength of 180 to 200 nm with the center wavelength at 190 nm. When the water treatment apparatus 100 is used for so-called sterilization in order to kill germs contained in water, it is preferable that the first excimer lamp 120 emits light having a wavelength of 240 to 280 nm with the center wavelength at 250 nm.

To use the first excimer lamp 120 suitably as a light source for decomposition of organic materials contained in water, it is preferable that xenon gas is sealed in the first excimer lamp 120 as the excimer emission gas and neodymium-activated lanthanum phosphate or neodymium-activated yttrium phosphate is used as the phosphor constituting the phosphor layer 21. To use the first excimer lamp 120 as a light source for so-called sterilization in order to kill germs contained in water, it is preferable that xenon gas is sealed in the first excimer lamp 120 as the excimer emission gas and praseodymium-activated yttrium aluminum borate or praseodymium-activated lanthanum phosphate is used as the phosphor constituting the phosphor layer 21.

The water treatment apparatus 100 includes: a treatment tank 101 having a treatment space for performing ultraviolet irradiation treatment on water to be treated; and a lamp support member 111 disposed so as to close the opening of the treatment tank 101. The water treatment apparatus 100 has a cylindrical overall shape. A light source composed of the first excimer lamp 120 is disposed in the treatment space of the treatment tank 101 such that the center axis (tube axis) of the light-emitting tube 11 extends vertically and that, when the treatment tank 101 is filled with water, at least part of the first excimer lamp 120 is immersed in the water and in contact therewith.

The treatment tank 101 includes a cylindrical side wall portion 102 made of, for example, stainless steel and a disk-shaped bottom wall portion 103 made of, for example, stainless steel. These portions are secured to each other through screw members 108A, and a hermetic structure is formed through an O-ring 109A.

An inflow port 102A for allowing water to be treated to flow into the treatment tank 101 and an outflow port 102B for allowing water treated by ultraviolet irradiation in the treatment tank 101 to flow out of the treatment tank 101 are formed in the side wall portion 102 of the treatment tank 101. Circulation tubes (not shown) for causing water to flow are connected to the inflow port 102A and the outflow port 102B.

In the example in the figure, the outflow port 102B is disposed at a higher level than the inflow port 102A.

The lamp support member 111 includes a closed end cylindrical base 112 made of a resin and a lid member 113 attached so as to close the opening of the base 112. A power supply circuit (not shown) for the first excimer lamp 120 and the one end portion of the first excimer lamp 120 to which the socket is attached are accommodated in the inner space of the lamp support member 111 together with the socket 30.

The lamp support member 111 is secured to the treatment tank 101 through screw members 108B, and a hermetic structure for the treatment tank 101 and the lamp support member 111 is formed through an O-ring 109B.

In the lamp support member 111, the first excimer lamp 120 is secured to a seal portion 114 provided in a bottom portion 112A of the base 112 through screw members 108C such that the one end portion to which the socket 30 is attached protrudes into the inner space of the lamp support member 111. A hermetic structure is formed in the seal portion 114 through an O-ring 109C.

In the example in the figure, reference numeral 116 represents a cushion for the power supply circuit disposed in the inner space of the base 112.

In the water treatment apparatus 100 configured as described above, when the first excimer lamp 120 is turned on and water to be treated is supplied through a circulation path and the inflow port 102A to the treatment space of the treatment tank 101, the water in the treatment space of the treatment tank 101 is irradiated with light (ultraviolet rays) from the first excimer lamp 120, whereby ultraviolet irradiation treatment is performed. Then the water subjected to ultraviolet irradiation treatment is discharged from the outflow port 102B through a circulation path to the outside of the treatment tank 101.

In the water treatment apparatus 100, the first excimer lamp 120 used as the light source is configured such that dielectric barrier discharge is utilized to obtain radiation light. It is not necessary to use, as the light-emitting material, mercury that is used as the light-emitting material of a low-pressure mercury lamp conventionally used as the light source of a water treatment apparatus, so the light-emission characteristics do not vary significantly according to the temperature of the use environment. Therefore, stable ultraviolet irradiation treatment can be performed irrespective of the temperature of water to be treated.

In the first excimer lamp 120, the first electrode 13 is disposed in the light-emitting space S of the light-emitting tube 11, and the second electrode 17 is embedded in the tube wall of the light-emitting tube 11. Since the pair of electrodes are not exposed to the outside of the light-emitting tube 11, the pair of electrodes do not come into contact with water to be treated. Therefore, no electric leakage or electric shock occurs, and sufficient safety is obtained. In addition, since no corrosion occurs in the pair of electrodes, a reduction in purity of water due to mixing of a corrosion product into the water to be treated does not occur, and unstable discharge caused by wear deformation of the pair of electrodes themselves does not occur. Therefore, favorable ultraviolet irradiation treatment can be performed for a long time.

In the first excimer lamp 120, the first electrode 13 is disposed at the center of the light-emitting space S of the light-emitting tube 11, and the second electrode 17 is embedded in the tube wall of the light-emitting tube 11 in a spiral form. Therefore, discharge occurs in the light-emitting space S radially outward from the center of the light-emitting tube 11, so ultraviolet irradiation treatment can be performed highly uniformly for the outside of the light-emitting tube 11.

When the excimer lamp of the present invention is used as the light source of the water treatment apparatus as described above, the installation form of the excimer lamp of the present invention is not limited to the form in which the excimer lamp is disposed in contact with an object to be treated, as shown in FIG. 21. For example, the excimer lamp of the present invention may be used in a form in which the excimer lamp is covered with a protection cover (wrapper tube) made of a light-transmitting material to prevent the excimer lamp from coming into contact with the object to be treated.

REFERENCE SIGNS LIST 10 first excimer lamp
11 light-emitting tube
11A sealed portion
13 first electrode
13A one end
13B other end
14 internal lead rod
15 external lead rod
16 conductive foil
17 second electrode
17A one end
18 connection member
19A, 19B electrode
21 phosphor layer
22 power supply coil (lamp-side terminal)
23 connection member
24 getter
25 getter accommodation space
25A communication path
29 supporter
30 socket
31A lamp accommodation portion
31B terminal accommodation portion
32 partition wall
33 power supply coil (socket-side terminal)
33A one end
33B other end
34A, 34B connection member
35 first electrode
36 second electrode
36A band-shaped electrode
36B connection conductive foil
37 internal lead rod
38 external lead rod
39 conductive foil
40 second excimer lamp
41 light-emitting tube
41A, 41B sealed portion
42 cylindrical tube
43 first electrode
44 internal lead rod
45 external lead rod
46 second electrode
47 internal lead rod
48 external lead rod
49 connection member
51A, 51B conductive foil
53 phosphor layer
54 power supply coil (lamp-side terminal)
55A, 55B connection member
60 socket
61A lamp accommodation portion
61B terminal accommodation portion
62 partition wall
63 power supply coil (socket-side terminal)
63A one end
63B other end
64A, 66B connection member
71 conductive foil (second conductive foil)
72 lead rod
73 conductive foil
74 conductive foil
75 internal lead rod
76 external lead rod
77 internal lead rod
81 cylindrical tube
82 lead rod
83 conductive foil (second conductive foil)
90 third excimer lamp
91 light-emitting tube
91A, 91B sealed portion
92 cylindrical tube
92A tube wall
93A, 93B conductive foil
94A, 94B internal lead rod
95A, 95B external lead rod
96 first electrode
97 second electrode
97A large-diameter portion
97B small-diameter portion 98 partial region formed in the large-diameter portion
99 phosphor layer
S light-emitting space
100 water treatment apparatus
101 treatment tank
102 side wall portion
102A inflow port
102B outflow port
103 bottom wall portion
108A, 108B, 108C screw member
109A, 109B, 109C O-ring
111 lamp support member
112 base
112A bottom portion
113 lid member
114 seal portion
116 cushion
120 first excimer lamp

The invention claimed is:

1. An excimer lamp comprising a light-emitting tube containing an excimer emission gas sealed therein, wherein
a pair of electrodes extending in a direction of a tube axis of the light-emitting tube are provided inside the light-emitting tube,
a cylindrical tube being made of a dielectric material and disposed inside the light-emitting tube so as to extend in the direction of the tube axis of the light-emitting tube, the cylindrical tube having an inner cylindrical surface defining an inner cylindrical hermitic space therein and an outer cylindrical surface,
one of the pair of electrodes is surrounded by the inner cylindrical surface and disposed in the inner cylindrical hermetic space,
the other one of the pair of electrodes is in contact with the excimer emission gas and is disposed to helically wrap around the outer cylindrical surface of the cylindrical tube and extend outwardly therefrom to the light-emitting tube, and
the pair of electrodes are electrically connected to respective conductive foils hermetically embedded in end portions of the light-emitting tube.

2. The excimer lamp according to claim 1, wherein one end of the cylindrical tube is foil-sealed integrally with the light-emitting tube.

3. The excimer lamp according to claim 1, wherein the one of the pair of electrodes has a coil shape.

4. The excimer lamp according to claim 1, wherein the hermetic space inside the cylindrical tube is reduced in pressure or filled with an inert gas.

5. The excimer lamp according to claim 1, wherein the other one of the pair of electrodes has a coil shape spiraled so as to surround the cylindrical tube.

6. The excimer lamp according to claim 1, wherein a phosphor layer is formed on an inner surface of a tube wall of the light-emitting tube, the phosphor layer containing a phosphor that emits ultraviolet rays when the phosphor receives, as excitation light, excimer light produced from an excimer generated from the excimer emission gas.

7. The excimer lamp according to claim 1, wherein the other one of the pair of electrodes is disposed so as to extend along the tube axis of the cylindrical tube, and
at least part of the other one of the pair of electrodes is in intimate contact with an outer surface of the cylindrical tube, the one of the pair of electrodes and the other one of the pair of electrodes facing each other through a tube wall of the cylindrical tube in at least one portion within an intimate contact region.

8. The excimer lamp according to claim 7, wherein the one of the pair of electrodes is disposed in contact with an inner surface of the cylindrical tube in the intimate contact region.

9. The excimer lamp according to claim 7, wherein the other one of the pair of electrodes is spaced apart from the outer surface of the cylindrical tube in a region other than the intimate contact region, and a space interposed between the other one of the pair of electrodes and the outer surface of the cylindrical tube within the region other than the intimate contact region forms an excimer discharge space.

10. The excimer lamp according to claim 7, wherein the other one of the pair of electrodes is in contact with an inner surface of the light-emitting tube in at least part of a region other than the intimate contact region.

11. An excimer lamp comprising:
a light-emitting tube made of quartz glass and containing an excimer emission gas sealed therein; and
a pair of electrodes for generating dielectric barrier discharge; wherein
one of the pair of electrodes is disposed in an internal space of the light-emitting tube so as to extend in a direction of a tube axis of the light-emitting tube,
the other one of the pair of electrodes is embedded in a tube wall of the light-emitting tube so as to extend in the direction of the tube axis of the light-emitting tube, and
the one of the pair of electrodes is electrically connected to a conductive foil hermetically embedded in an end portion of the light-emitting tube,
wherein only the other one of the pair of electrodes is in contact with the excimer emission gas and the one of the pair of electrodes disposed in the internal space of the light-emitting tube is isolated from contact with the excimer gas.

12. The excimer lamp according to claim 11, wherein a phosphor layer is formed on an inner surface of the light-emitting tube, the phosphor layer containing a phosphor that emits ultraviolet rays when the phosphor receives, as excitation light, excimer light produced from an excimer generated from the excimer emission gas.

13. The excimer lamp according to claim 12, wherein the phosphor emits light having a wavelength of not more than 300 nm.

14. The excimer lamp according to claim 11, wherein the other one of the pair of electrodes is supplied with electric power through inductive coupling with a power supply electrode disposed outside the light-emitting tube.

* * * * *